(12) United States Patent
van Mierlo et al.

(10) Patent No.: US 11,112,419 B2
(45) Date of Patent: Sep. 7, 2021

(54) LABORATORY DISTRIBUTION SYSTEM

(71) Applicant: Roche Diagnostics Operations, Inc., Indianapolis, IN (US)

(72) Inventors: Hans van Mierlo, Waalwijk (NL); Gottlieb Schacher, Kriens (CH); Marcel Kaeppeli, Merenschwand (CH); Reto Huesser, Cham (CH); Andreas Drechsler, Baar (CH); Matthias Goetz, Zurich (CH); Nenad Milicevic, Baar (CH)

(73) Assignee: Roche Diagnostics Operations, Inc., Indianapolis, IN (US)

( * ) Notice: Subject to any disclaimer, the term of this patent is extended or adjusted under 35 U.S.C. 154(b) by 441 days.

(21) Appl. No.: 16/031,446

(22) Filed: Jul. 10, 2018

(65) Prior Publication Data

US 2019/0004077 A1    Jan. 3, 2019

Related U.S. Application Data

(63) Continuation of application No. PCT/EP2017/050427, filed on Jan. 10, 2017.

(30) Foreign Application Priority Data

Jan. 22, 2016   (EP) .................................... 16152359

(51) Int. Cl.
*G01N 35/02*   (2006.01)
*B65G 17/00*   (2006.01)
(Continued)

(52) U.S. Cl.
CPC ......... *G01N 35/021* (2013.01); *B65G 17/005* (2013.01); *B65G 17/123* (2013.01);
(Continued)

(58) Field of Classification Search
CPC ......... G01N 35/021; G01N 2035/0261; G01N 2035/0406; G01N 2035/0465;
(Continued)

(56) References Cited

U.S. PATENT DOCUMENTS

| 1,218,746 A | 3/1917 | Coombs |
| 3,575,692 A | 4/1971 | Gilford |

(Continued)

FOREIGN PATENT DOCUMENTS

| CN | 202057667 U | 11/2011 |
| DE | 3809294 A1 | 10/1989 |

(Continued)

OTHER PUBLICATIONS

International Search Report dated Mar. 28, 2017, in Application No. PCT/EP2017/050427, 2 pp.

*Primary Examiner* — Benjamin R Whatley
(74) *Attorney, Agent, or Firm* — Roche Diagnostics Operations, Inc.

(57) ABSTRACT

A laboratory distribution system is presented. The system comprises diagnostic laboratory container carriers and a conveyor. The conveyor comprises an endless drive defining a closed-loop conveyor pathway. The system comprises supporting elements attached to the endless drive. The supporting elements receive a container carrier and transport the container carrier in an upright position along a pathway section. The supporting elements are mounted pivotally about a horizontal pivot axis to the drive and structured such that a center of gravity of the supporting element with or without an empty or loaded container carrier is arranged below and vertically aligned with the pivot axis when the supporting element is in an upright position such that each supporting element is free to pivot about the associated pivot axis under the effect of gravitational forces acting on the (Continued)

supporting element for maintaining the supporting elements in an upright position while travelling along the path.

23 Claims, 10 Drawing Sheets

(51) Int. Cl.
| | |
|---|---|
| *B65G 17/12* | (2006.01) |
| *B65G 17/46* | (2006.01) |
| *B65G 47/57* | (2006.01) |
| *B65G 17/32* | (2006.01) |
| *B65G 17/34* | (2006.01) |
| *B65G 43/00* | (2006.01) |
| *G01N 35/04* | (2006.01) |

(52) U.S. Cl.
CPC ............ *B65G 17/32* (2013.01); *B65G 17/34* (2013.01); *B65G 17/46* (2013.01); *B65G 43/00* (2013.01); *B65G 47/57* (2013.01); *B65G 2201/0261* (2013.01); *G01N 2035/0406* (2013.01); *G01N 2035/0465* (2013.01); *G01N 2035/0467* (2013.01); *G01N 2035/0484* (2013.01)

(58) Field of Classification Search
CPC ... G01N 2035/0467; G01N 2035/0484; B65G 17/005; B65G 17/123; B65G 17/32; B65G 17/34; B65G 17/46; B65G 43/00; B65G 47/57; B65G 2201/0261
See application file for complete search history.

(56) References Cited

U.S. PATENT DOCUMENTS

| | | | |
|---|---|---|---|
| 4,595,562 A | 6/1986 | Liston et al. | |
| 4,858,767 A | 8/1989 | Myers et al. | |
| 5,380,487 A * | 1/1995 | Choperena | G01N 35/021 |
| | | | 422/63 |
| 6,394,260 B1 | 5/2002 | Barth et al. | |
| 7,670,553 B2 | 3/2010 | Babson | |
| 9,959,697 B2 | 5/2018 | King et al. | |
| 2002/0001542 A1 | 1/2002 | Itoh | |
| 2009/0003981 A1* | 1/2009 | Miller | F25D 13/06 |
| | | | 414/267 |
| 2011/0136578 A1* | 6/2011 | Kawamura | F16C 33/6633 |
| | | | 464/15 |
| 2012/0043183 A1 | 2/2012 | Hannessen | |
| 2014/0234978 A1* | 8/2014 | Heise | B65G 54/02 |
| | | | 436/48 |
| 2014/0301916 A1* | 10/2014 | Ohga | G01N 35/04 |
| | | | 422/562 |
| 2015/0276778 A1 | 10/2015 | Riether et al. | |
| 2016/0334431 A1* | 11/2016 | Noda | G01F 23/2928 |

FOREIGN PATENT DOCUMENTS

| | | |
|---|---|---|
| DE | 102008002245 A1 | 12/2009 |
| DE | 102010028905 A1 | 11/2011 |
| FR | 2576003 B1 | 4/1992 |
| GB | 261933 A | 12/1926 |
| GB | 1010431 A | 11/1965 |
| GB | 2435098 A | 8/2007 |
| JP | S47-4253 Y1 | 2/1972 |
| JP | S53-122724 U | 9/1978 |
| JP | S55-031487 U | 2/1980 |
| JP | S61-44742 U | 3/1986 |
| JP | S62-76465 A | 4/1987 |
| JP | H03-118921 U | 12/1991 |
| JP | 2002-098705 A | 4/2002 |
| WO | 1991/001007 A1 | 1/1991 |
| WO | 2003/042048 A3 | 5/2003 |
| WO | 2013/064665 A1 | 5/2013 |
| WO | 2013/070740 A1 | 5/2013 |
| WO | 2015/059620 A1 | 4/2015 |

\* cited by examiner

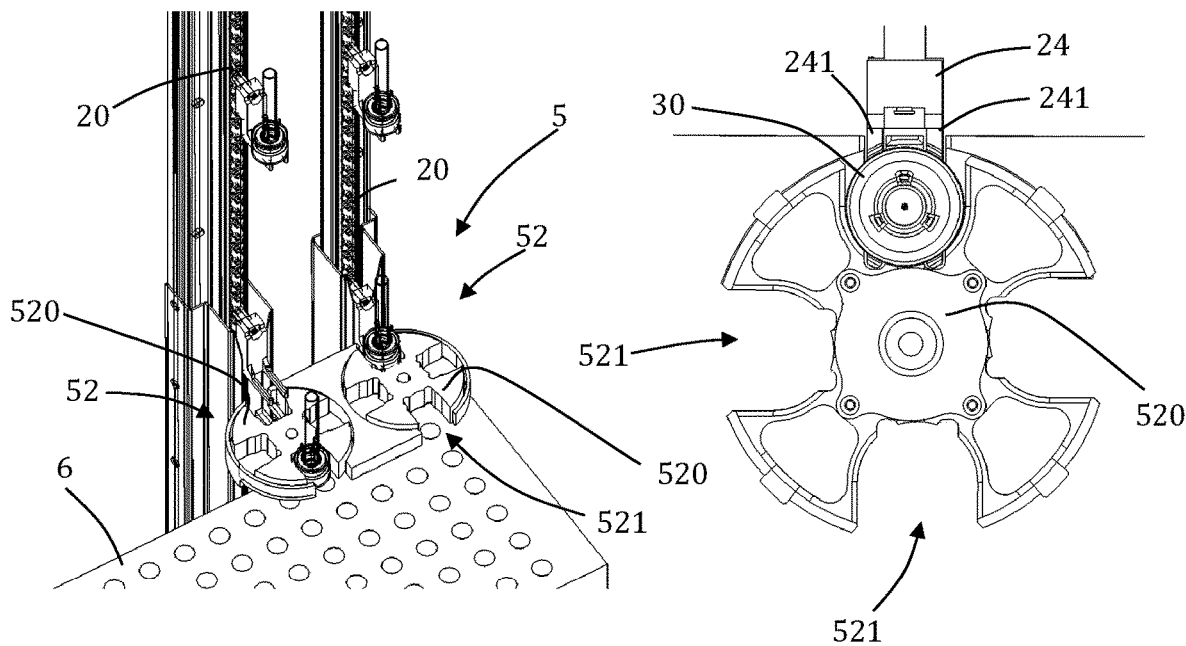
*Fig. 13*         *Fig. 14*
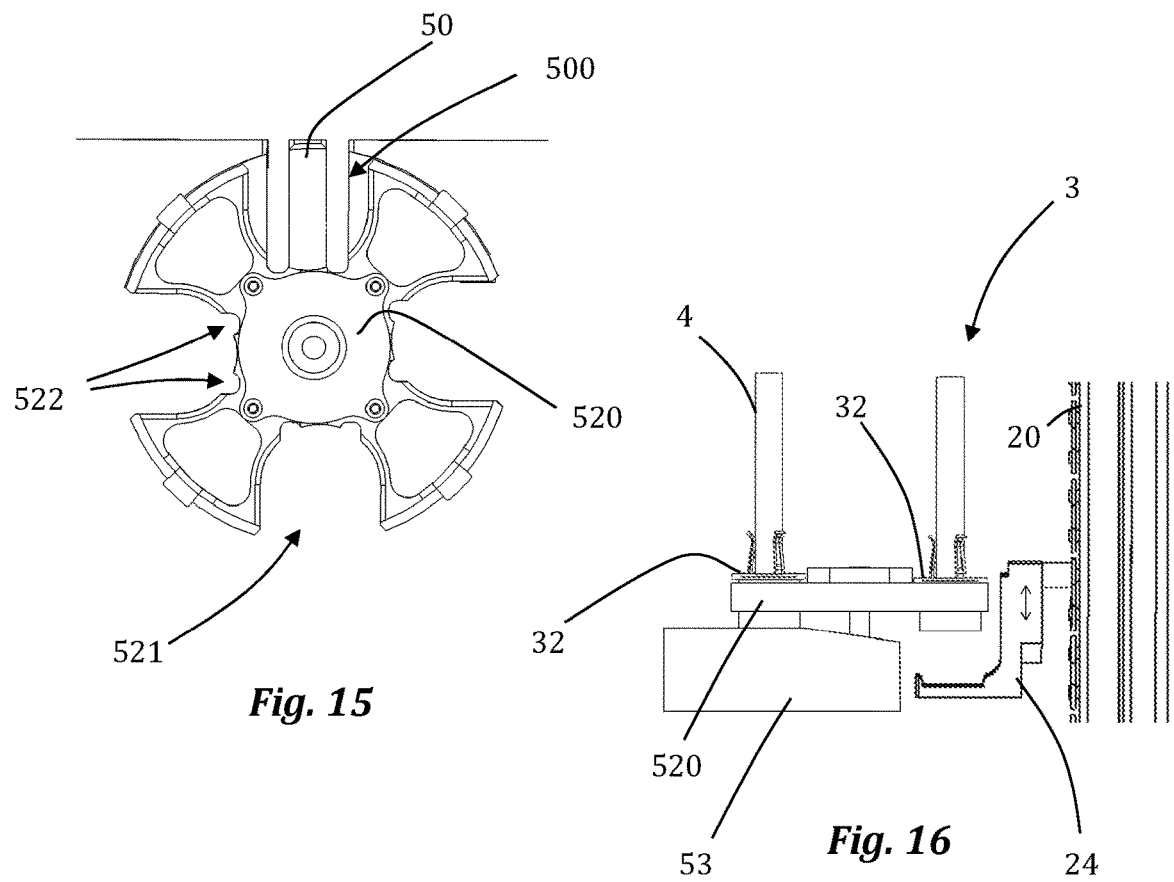
*Fig. 15*         *Fig. 16*

LABORATORY DISTRIBUTION SYSTEM

CROSS-REFERENCE TO RELATED APPLICATIONS

This application is a continuation of PCT/EP2017/050427 filed Jan. 10, 2017, which is based on and claims priority to EP 16152359.2 filed Jan. 22, 2016, which is hereby incorporated by reference.

BACKGROUND

The present disclosure generally relates to a laboratory distribution system for use in a laboratory automation system and to a laboratory automation system comprising a laboratory distribution system.

A laboratory automation system comprises a number of pre-analytical, analytical and/or post-analytical stations, in which samples, for example blood, saliva, swab, urine and other specimens taken from the human body, are processed. It is generally known to provide sample tubes containing the samples. The sample tubes are also referred to as test tubes. For processing of the sample, the sample tubes are distributed to designated stations or operating positions of the laboratory automation system.

Several sample tubes can be placed in so-called racks for a handling and for a distribution with the laboratory automation system. In an alternative system, sample tubes are placed in an upright or vertical position in so called pucks having a receiving area for retaining one single sample tube. The pucks are also referred to as single sample tube carriers.

Further, carriers for example tubes or vessels can be provided, for transporting auxiliary fluids or substances, such as reagents, quality control liquids and/or calibration liquids. In the context of the application, single sample tube carriers or other carriers are conjointly referred to as diagnostic laboratory container carriers.

In order to transfer single sample tube carriers between stations of a laboratory automation system arranged at different levels or heights, an endless motor-driven belt to which shelves are attached at a regular distance over the entire height can be used. The shelves are intended to receive and transport single sample tube carriers. The belt is intermittently driven and pushers are provided for pushing the sample tube carriers onto the shelves or from the shelves to subsequent conveyor devices while the belt is stopped.

However, there is a need for a laboratory distribution system allowing a distribution of sample tubes in a closed or unclosed manner and/or additional containers, such as vessels or tubes.

SUMMARY

According to the present disclosure, a laboratory distribution system for use in a laboratory automation system is presented. The laboratory distribution system can comprise a plurality of diagnostic laboratory container carriers and a conveyor device. The conveyor device can comprise an endless drive member defining a closed-loop conveyor pathway and a plurality of supporting elements attached to the endless drive member. The supporting elements can be configured to receive one diagnostic laboratory container carrier and to transport the diagnostic laboratory container carrier in an upright position along at least a section of the conveyor pathway. The supporting elements can each be mounted pivotally about a horizontal pivot axis by a pivot bearing to the drive member and structured such that a center of gravity of the supporting element with or without an empty or loaded diagnostic laboratory container carrier can be arranged below and vertically aligned with the pivot axis when the supporting element is in an upright use position such that each supporting element can be free to pivot about the associated pivot axis under the effect of gravitational forces acting on the supporting element for maintaining an upright use position while travelling along the conveyor path.

Accordingly, it is a feature of the embodiments of the present disclosure to provide for a laboratory distribution system allowing a distribution of sample tubes in a closed or unclosed manner and/or additional containers, such as vessels or tubes. Other features of the embodiments of the present disclosure will be apparent in light of the description of the disclosure embodied herein.

BRIEF DESCRIPTION OF THE SEVERAL VIEWS OF THE DRAWINGS

The following detailed description of specific embodiments of the present disclosure can be best understood when read in conjunction with the following drawings, where like structure is indicated with like reference numerals and in which:

FIG. 13 illustrates a detail XIII of FIG. 4 showing another embodiment of transfer device for transferring a diagnostic laboratory container carrier to the supporting element according to an embodiment of the present disclosure.

FIG. 14 illustrates a rotatable disc of the transfer device of FIG. 13 during take-over of a diagnostic laboratory container carrier according to an embodiment of the present disclosure.

FIG. 15 illustrates the rotatable disc of the transfer device of FIG. 13 at idle times according to an embodiment of the present disclosure.

FIG. 16 illustrates a side view of the transfer device similar to FIG. 13 during take-over of a diagnostic laboratory container carrier according to an embodiment of the present disclosure.

DETAILED DESCRIPTION

Figure 1:
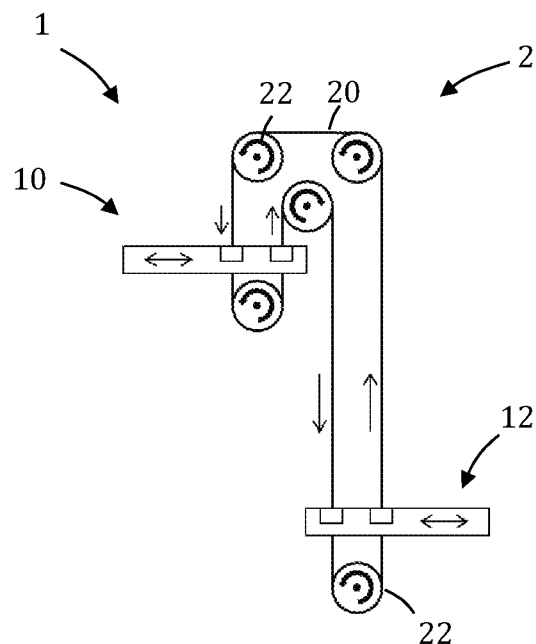
FIG. 1 illustrates a layout of a laboratory distribution system for lifting or lowering diagnostic laboratory container carriers according to a first embodiment of the present disclosure.

In the following detailed description of the embodiments, reference is made to the accompanying drawings that form a part hereof, and in which are shown by way of illustration, and not by way of limitation, specific embodiments in which the disclosure may be practiced. It is to be understood that other embodiments may be utilized and that logical, mechanical and electrical changes may be made without departing from the spirit and scope of the present disclosure.

A laboratory distribution system for use in a laboratory automation system is presented. The laboratory distribution system can comprise a plurality of diagnostic laboratory container carriers and a conveyor device. The conveyor device can comprise an endless drive member such as, for example, a belt or a chain, defining a closed-loop conveyor pathway and a plurality of supporting elements attached to the endless drive member. The supporting elements can be configured to receive one diagnostic laboratory container carrier and to transport the diagnostic laboratory container carrier in an upright position along at least a section of the conveyor pathway. The supporting elements can each be mounted pivotally about a horizontal pivot axis by a pivot bearing to the drive member and structured such that a center of gravity of the supporting element with or without an empty or loaded diagnostic laboratory container carrier can be arranged below and vertically aligned with the pivot axis when the supporting element is in an upright use position such that each supporting element can be free to pivot about the associated pivot axis under the effect of gravitational forces acting on the supporting element for maintaining the supporting elements in an upright use position while travelling along the conveyor path.

Diagnostic laboratory container carriers such as, for example, single sample tube carriers, can be conveyed by the supporting elements either empty or while retaining a container such as, for example, a sample tube. Due to the pivotable or rotatable mounting of the supporting elements, an arbitrary conveyor pathway having vertical, horizontal and/or inclined sections can be provided. Due to a gravitational force exerted by the gravitational field of the earth, the supporting elements can be passively rotated to maintain the carriers and, if applicable, a container such as a sample tube retained in the carrier, in an upright position. The pivotally mounted supporting elements can also be referred to as gondolas.

The supporting elements can each be structured such that a center of gravity can be arranged below and vertically aligned with the pivot axis when the supporting element is in an upright use position. In one embodiment, the supporting elements can each be provided with a counterweight arranged below the pivot axis when the supporting element is in an upright use position. The shape and weight of the supporting element such as, including the counterweight can be chosen by the person skilled in the art suitably to ensure that the supporting element remains in an upright use position when changing the inclination of the conveyor path. In one embodiment, the shape and weight can be chosen such that the weight of the diagnostic laboratory container carrier, regardless of whether empty or loaded, can be neglectable for determining the center of gravity of the system comprising the supporting element and the diagnostic laboratory container carrier.

Alternatively, or in addition, in one embodiment, the supporting elements can have a receiving area for receiving one diagnostic laboratory container carrier. The receiving area can be arranged below the pivot axis when the supporting element is in an upright use position. Due to this arrangement, it can be possible to ensure that the center of gravity is always kept below the pivot axis and that the supporting element can remain in an upright use position when changing the inclination of the conveyor path.

In other embodiments, in alternative or in addition, the supporting elements can be provided with a boundary wall extending at least partly about the periphery of a receiving area for centering and retaining a diagnostic laboratory container carrier having a circular cylindrical base. The circumferential extent and/or the height of the boundary wall can be suitably chosen by the person skilled in the art in dependence of the speed of the system and the size of the diagnostic laboratory container carriers in order to ensure that the diagnostic laboratory container carriers remain on the supporting elements. The boundary wall can also ensure that the diagnostic laboratory container carrier can be positioned on the supporting element with a center of gravity at least substantially vertically aligned with pivot axis.

In one embodiment, the supporting elements can further comprise a sliding nut or a roller for guiding the supporting elements along a conveyor pathway defined by a guiding profile. In some embodiments, at least one linear extending guiding profile can be provided for guiding the endless drive member at least along a section of the closed-loop conveyor pathway. In such a system, the supporting elements apart from the pivot bearing can be unconstrained.

The pivot bearing, in some embodiments, can be a plain bearing made up of at least two components. One component can be soft and the other component can be hard. Providing soft and hard components can be advantageous for minimizing abrasion. For example, the plain bearing, in one embodiment, can comprise a pin made of steel on which a bearing bush made of bronze or plastic such as, for example, polyoxymethylene (POM), polyethylene (PE) or copolymers thereof, can be mounted. Of course, other material combinations can be possible. Depending on the material combination used, the friction coefficients, for example, can be between about 0.1 and about 0.4. When using a material combination steel/plastic, the plastic bearing bush, in one embodiment, can be formed integrally with a body of the supporting element. In other embodiments, a separate bearing bush can be replaceably mounted in the body of the supporting element allowing the bearing bush to be replaced if worn due to the frictional forces.

In an alternative embodiment, the pivot bearing can be a rolling-element bearing. An outer ring of the bearing can, for example, be mounted to the body of the supporting element using a retaining ring allowing for a replacement of the rolling-element bearing without a replacement of the supporting element. In other embodiments, the outer ring can be fixed, for example, by adhesive bonding and/or press-fit mounted. The type of rolling-element bearing can be chosen to allow for a cost-effective solution. To this end, in one embodiment, deep groove ball bearings can be used.

The drive member, in one embodiment, can be a belt to which pins for receiving the supporting elements can be mounted. In some embodiments, the drive member can be a drive chain comprising a plurality of links connected by pins. A subgroup of the pins can be structured as extended pins projecting at one side of the drive chain from the links. Each supporting element can be pivotally mounted to one extended pin.

According to another embodiment, a shock reducing device can be provided for reducing a mechanical shock exerted on a payload retained by one of the plurality of diagnostic laboratory container carriers when transferring the diagnostic laboratory container carrier onto one of the plurality of supporting elements or off one of the number of supporting elements without stopping the drive member and/or disconnecting the supporting elements from the drive member. The shock-reducing device can be advantageous in systems having a high through-put and a limited time window for transferring carriers onto or off the supporting elements. In some embodiments, the supporting elements can be mounted pivotally to the drive member. However, a shock-reducing device may also be combined, for example, with a device, in which the supporting elements can be attached to two substantially parallel arranged belts or chains such that the supporting elements can maintain their upright use position while travelling along the conveyor pathway as described in US 2015/0276778 A1, which is hereby incorporated by reference.

In one embodiment, the shock reducing device can comprise a plurality of carrier-side shock absorbing elements having elastic and/or damping properties. The carrier-side shock absorbing elements can be provided at each of the diagnostic sample tube carriers. In other words, the diagnostic sample tube carriers can be equipped with the carrier-side shock absorbing elements such that forces exerted on the diagnostic sample tube carrier when transferring the diagnostic sample tube carrier onto one of the supporting elements or off one of the supporting elements may not be transferred, or only a small fraction of such forces may be transferred, to the payload such as, for example, a sample tube, retained in the diagnostic sample tube carrier. The carrier-side shock absorbing elements can be made of any suitable material having a size and/or shape suitably selected by the person skilled in the art. Suitable carrier-side shock absorbing elements can include, but are not limited to, elastomer dampers, spring elements, foam rubber cushions, and the like.

For the purpose of isolating the payload from the diagnostic sample tube carrier, in one embodiment, at least a contact portion of a retaining area of a base of each diagnostic sample tube carrier for contacting the payload such as, for example, a sample tube, can be made of or equipped with at least one carrier-side shock absorbing element. In other words, the retained payload can contact the diagnostic sample tube carrier via at least one carrier-side shock absorbing element.

Alternatively, or in addition, in one embodiment, at least a portion of a bottom part of a base of each diagnostic sample tube carrier, in which bottom part can be arranged below the retaining area for the payload, can be made of or equipped with at least one carrier-side shock absorbing element. A bottom surface of the diagnostic sample tube carrier can be made of a material having suitable guiding properties for moving the diagnostic sample tube carrier along a transport surface. In this case, in some embodiments, one or more carrier-side shock absorbing element(s) can be provided inside the base between the bottom surface and the retaining area. The retaining area can be moveable in a substantially vertical direction relative to the bottom surface for avoiding a transfer of motion or forces from the bottom surface to the retaining area.

Alternatively, or in addition, to the carrier-side shock absorbing elements, the shock reducing device, in other embodiments, can comprise a plurality of supporting-element-side shock absorbing elements having elastic and/or damping properties. The supporting-element-side shock absorbing elements can be provided at each of the supporting-elements.

For this purpose, in one embodiment, at least a portion of a receiving area for receiving and holding a received diagnostic sample tube carrier of each supporting element can be made of or equipped with at least one supporting-element-side shock absorbing element. The supporting-element-side shock absorbing element, for example, can be an elastomer damper.

Alternatively, or in addition, in one embodiment, each supporting element can have at least a first part comprising the receiving area and a second part. The first part and the second part can be connected moveably relative to each other in a substantially vertical direction by at least one supporting-element-side shock absorbing element.

In addition, or alternatively, to a pivotal mounting to the drive member, the supporting elements or gondolas, in one embodiment, can be gimbal-mounted, resiliently mounted and/or mounted with play in order to compensate smaller inaccuracies of the drive member and/or the mount in the horizontal direction when transferring a diagnostic sample tube carrier onto the supporting elements or off the supporting elements. In the case where the supporting elements are resiliently mounted, the resilience of the mounting device can also be referred to as supporting-element-side shock absorbing element.

In the case where the supporting elements are resiliently mounted using, for example, supporting-element-side shock absorbing elements and/or in the case where the supporting elements have at least two parts connected by supporting-element-side shock absorbing elements, in one embodiment, in addition, a supporting element acceleration and/or deceleration device can be provided. The supporting element acceleration and/or deceleration device can be configured to accelerate and/or decelerate the supporting element or at least the first part of the supporting element relative to the drive member when transferring one of the number of diagnostic sample tube carriers onto the supporting element or off the supporting element. In other words, the acceleration and/or deceleration device can stop or decelerate a supporting element or a first part of the supporting element to a very slow motion when transferring a diagnostic sample tube carrier onto the supporting elements or off the supporting elements, while continuing a movement of the drive member. After completing the transfer, the supporting element can be accelerated to the speed of the drive member and moved into a neutral mounting position at the drive member. The supporting element acceleration and/or deceleration device, in one embodiment, can further be configured to secure the first part to the second part by bypassing the supporting-element-side shock absorbing elements for hindering a relative movement between the first part and the second part during a conveyance of the supporting elements, when no diagnostic sample tube carrier elements are transferred to or off the supporting element and/or to release the first part from the second part such that the first part and the second part can be connected moveable relative to each other in the substantially vertical direction by at least one supporting-element-side shock absorbing element for transferring a diagnostic sample tube carrier to the supporting element.

In still another embodiment, the shock reducing device can comprise a number of magnetically active elements. Each magnetically active element can be selected from the group comprising electro-magnets, permanent magnets, smart magnets or magnetizable elements. The diagnostic sample tube carriers and the receiving areas of the supporting elements can each comprise at least one magnetically active element. In the context of the application, a magnetically active element in which the polarity can be rapidly changed, for example, by software, is referred to as smart magnet or programmed magnet. Smart magnets are offered for example under the tradename Polymagnets® by Correlated Magnetics Research LLC, Campbell, U.S.A.

In one embodiment, the magnetically active elements of the diagnostic sample tube carriers and the magnetically active elements of the receiving areas of the supporting elements can be arranged to repel each other when transferring one of the diagnostic sample tube carriers onto one of the supporting elements or off one of the supporting elements. Due to the magnetic fields, a force opposite to the gravitational force can be exerted on the diagnostic sample tube carrier when placing the diagnostic sample tube carrier onto the supporting element. The magnetically active elements can be chosen such that the gravitational force acting on the diagnostic sample tube carrier is higher than the magnetic force acting on the diagnostic sample tube carrier in the opposite direction such that a damping effect can be achieved. However, placing the diagnostic sample tube carrier onto the supporting element is not hindered. In order to avoid a horizontal slip or rotation of the diagnostic sample tube carrier during a transport thereof on the supporting element, in one embodiment, the receiving area can be provided with an anti-slip surface coating.

In another embodiment, the supporting elements can be configured to apply a magnetic force to a diagnostic laboratory container carrier comprising at least one magnetically active device such as, for example, at least one permanent magnet for attracting the diagnostic laboratory container carrier. The magnetic force can allow for a reliable retaining of the diagnostic laboratory container carriers. Alternatively, or in addition, the supporting elements, in one embodiment, can each comprise an electroactive element and can be configured to apply an electric field to the at least one an electroactive element for gripping a diagnostic laboratory container carrier. The electroactive element can be made, for example, at least partly from an electroactive polymer. By applying the electric field, the electroactive element can be deformed or moved for gripping the diagnostic laboratory container carrier. Such a magnetic or electroactive retention system can also be advantageous in conveyor systems having an endless drive member and supporting elements, which may not be pivotally mounted and suitable, for example, to convey diagnostic laboratory container carriers along conveyor paths or conveyor path sections without any change in the direction.

In one embodiment, the magnetically active elements of the diagnostic sample tube carriers and/or of the receiving areas of the supporting elements can be configured to rapidly reverse the polarity, to arrange the magnetically active elements of the diagnostic sample tube carriers and the magnetically active elements of the receiving areas of the supporting elements to repel each other when transferring the diagnostic sample tube carrier onto the supporting element or off the supporting element and to attract each other after a transfer is completed. Hence, the magnetically active elements can be used to reduce a mechanical shock during transfer of a diagnostic sample tube carrier onto the supporting element and to securely hold the diagnostic sample tube carrier after the transfer is completed. For example, for this purpose, the magnetically active elements of the supporting elements can be electro-magnets and/or smart magnets.

In another embodiment, a carrier acceleration and/or deceleration device can be provided. The carrier acceleration and/or deceleration device can be configured to accelerate and/or decelerate one of the plurality of diagnostic sample tube carriers relative to the drive member when transferring the diagnostic sample tube carrier onto one of the plurality of supporting elements or off one of the plurality of supporting elements. Such a device may also be used for moving a diagnostic sample tube carrier onto a supporting element in a substantially horizontal section of the conveyor path.

According to one embodiment, the system can further comprise at least one transfer device. The transfer device can be configured to cooperate with the supporting elements for transferring one diagnostic laboratory container carrier such as, for example, one single sample tube carrier, onto one of the supporting elements and/or for taking-over one diagnostic laboratory container carrier such as, for example, one single sample tube carrier, from one of the supporting elements.

Such a transfer device can also be advantageous for use in laboratory distribution system with a conveyor device comprising an endless drive member such as, for example, a belt or a chain, defining a closed-loop conveyor pathway and a plurality of supporting elements attached to the endless drive member. The supporting elements may not necessarily be mounted pivotally to the drive member.

In one embodiment, the endless drive member can be stopped and the diagnostic laboratory container carrier can be moved onto the supporting element, for example, pushed onto the supporting element. In another embodiment, the diagnostic laboratory container carrier can be held by magnetic forces in the movement path of the supporting elements for a transfer to or from the supporting elements. Holding elements protruding into the movement path of the supporting elements can be avoided.

As described above, in the case where the endless drive member is not stopped for transferring the carriers onto or off the supporting elements, in some embodiments, a shock reducing device can be provided for reducing a mechanical shock exerted on a payload such as, for example, a sample tube, retained by one of the plurality of diagnostic laboratory container carriers during the transfer to or off the supporting element. In one embodiment, the shock reducing device can comprise a plurality of transfer-device shock absorbing elements having elastic and/or damping properties. A transfer area for receiving carriers from one of the plurality of supporting elements when transferring the carrier off the supporting element can be made of or equipped with at least one transfer-device shock absorbing element and/or at least a first part of the transfer device provided with the transfer area can be mounted moveable in a substantially vertical direction by at least one transfer-device shock absorbing element. In one embodiment, in the case where no carrier-side shock absorbing elements are provided, in some embodiments, the laboratory distribution system can comprise both supporting-element-side shock absorbing elements and transfer-device shock absorbing elements.

In a further embodiment, the transfer device can comprise a holding element arranged in a transfer position in the movement path of the supporting elements. The holding element and the supporting elements can have complementary shapes to avoid an interference of the holding element arranged in the transfer position with the movement path of the supporting elements.

Due to the non-overlapping design of the supporting elements and the holding element arranged in the transfer position, a take-over of the diagnostic laboratory container carriers can be possible without stopping the endless drive member. This can be advantageous as sample tubes conveyed by the conveyor device can be transported in a continuous flow ensuring a considerate or gentle handling of the samples. Further, the transfer device can be arranged anywhere along the conveyor path without the necessity to effect the transfer at an exact position and with small tolerances. The transfer device can be positioned along the conveyor path such that the supporting elements can be moved in a substantially vertical direction upon the transfer. In one embodiment, the endless drive member can be driven to move at a constant speed. In other embodiments, the speed can be altered to allow a smooth transfer of the diagnostic laboratory container carriers.

The shape of the supporting elements and the holding elements can be chosen by the person skilled in the art in order to allow for a reliable support of the diagnostic laboratory container carriers on the supporting elements as well as on the holding elements.

In one embodiment, the shape of one of the holding element and the supporting elements can be in the form of a fork having at least two fingers and the shape of the other one of the holding element and the supporting elements can be in the form of a jaw passing through the at least two fingers. For example, the holding element can be in the form of a fork having two fingers between which the jaw of the supporting elements can pass upon moving the supporting element past the holding element in a substantially vertical direction. In the case where a diagnostic laboratory container carrier is placed on the fork, the jaw can take-over this diagnostic laboratory container carrier.

It can be understood that the shape of the holding element avoiding an interference with the supporting elements can allow maintaining the holding element fixed in position in the transfer position. Empty supporting elements can pass by the holding element without any interference. In this embodiment, the transfer device can comprise elements for transferring one diagnostic laboratory container carrier onto and/or off the stationary arranged holding element. In an alternative embodiment, the holding element can be arranged moveably into and out of the transfer position for allowing supporting elements carrying one of the number of diagnostic laboratory container carriers to pass pay. For example, the holding element can be mounted slidingly and moved laterally into and out of the transfer position.

In one embodiment, the transfer device can comprise a carousel conveyor with a rotatable or swivelable disc having at least one recess for receiving one diagnostic laboratory container carrier, wherein the disc can function as the holding element. The diagnostic laboratory container carrier can be provided with a rim placed on a top surface of the disc in the periphery of the recess for holding the diagnostic laboratory container carriers. In this embodiment, the rim can function as a fork for holding the diagnostic laboratory container carrier allowing supporting elements to pass through the recess for taking-over a diagnostic laboratory container carrier presented. A movement of the disc can be synchronized with the conveyor device in order to avoid any interference. A timing control, in one embodiment, can comprise optical barriers and/or presence detectors arranged at the transfer device such as, for example, at the disc, and the drive member.

Alternatively, or in addition, in another embodiment, the transfer device can comprise at least one active transfer element for moving one of the plurality of diagnostic laboratory container carriers onto the holding element arranged in the transfer position or for moving one of the plurality of diagnostic laboratory container carriers of the holding element arranged in the transfer position. In other words, the holding element can remain arranged fixed in position in the transfer position. In order to move a diagnostic laboratory container carrier onto or off the holding element, in one embodiment, an active transfer element selected from a group comprising a carousel conveyor, a transport belt, a pusher, and a screw conveyor can be provided.

In one embodiment, the transfer device can further be configured for singling out diagnostic laboratory container carriers. In other words, the transfer device can ensure that at one pick-up position, only one diagnostic laboratory container carrier can be arranged at the time.

The laboratory distribution system can be combined with various other transport systems configured to transport diagnostic laboratory container carriers individually or in bundles. The laboratory distribution system, in one embodiment, can further comprise a transport system with a plurality of electro-magnetic actuators. The diagnostic laboratory container carriers can each comprise at least one magnetically active device such as, for example, at least one permanent magnet. The plurality of electro-magnetic actuators can be configured to move the diagnostic laboratory container carriers along the transport system by applying a magnetic force to the diagnostic laboratory container carriers. In one embodiment, the system can comprise a transport plane configured to carry the diagnostic laboratory container carriers. The plurality of electro-magnetic actuators can be stationary arranged below the transport plane. The electro-magnetic actuators can be configured to move a diagnostic laboratory container carrier along the top of the transport plane by applying a magnetic force to the diagnostic laboratory container carrier. The diagnostic laboratory container carriers can be distributed individually along the transport system such as, for example, over the transport plane to an appropriate station and/or to the conveyor device comprising the endless drive member.

A laboratory automation system is presented. The laboratory automation system can comprise a plurality of pre-analytical, analytical and/or post-analytical stations and a laboratory distribution system as described above.

Figure 2:
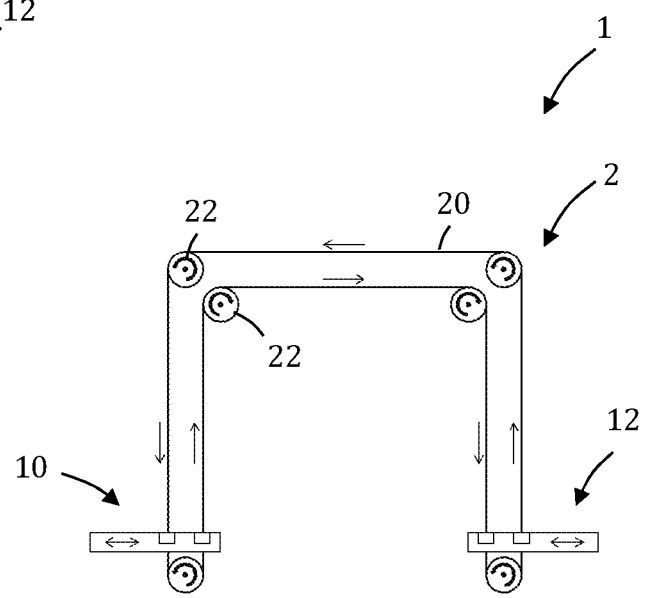
FIG. 2 illustrates a layout of a laboratory distribution system for providing a passageway according to a second embodiment of the present disclosure.
Figure 3:
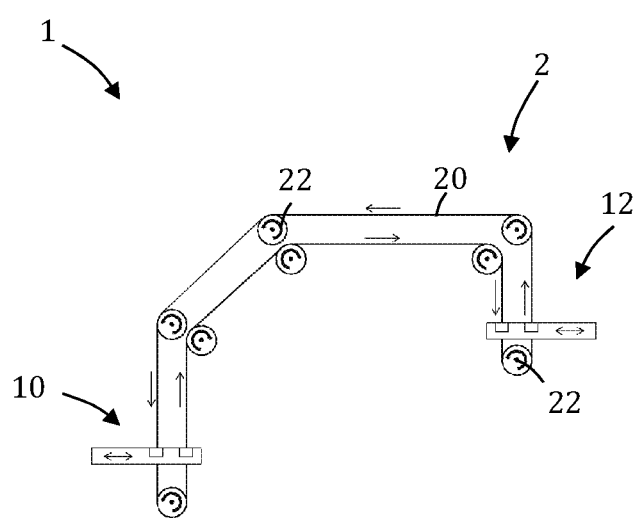
FIG. 3 illustrates a layout of a laboratory distribution system for distributing diagnostic laboratory container carriers according to a third embodiment of the present disclosure.

FIGS. 1 to 3 show three embodiments of a layout of a sample distribution system, in particular, a sample distribution system 1 for conveying diagnostic laboratory container carriers (not shown in FIGS. 1 to 3) between a first station 10 and a second station 12 of a laboratory automation system.

Each laboratory distribution system 1 can comprise a conveyor device 2 with an endless drive member 20 and a number of pulleys or sprockets 22 defining in the embodiments shown a closed-loop conveyor pathway. At least one of the pulleys or sprockets 22 can be driven for moving the endless drive member 20 along the conveyor pathway. The remaining pulleys or sprockets can be idler pulleys or sprockets.

As shown in FIGS. 1 to 3, arbitrary conveyor pathways may be provided. For example, FIG. 1 shows a layout arranged for lifting or lowering diagnostic laboratory container carriers between the first station 10 and the second station 12, FIG. 2 shows a layout for providing a passageway between two stations 10, 12, and FIG. 3 shows a layout of for distributing diagnostic laboratory container carriers between two stations 10, 12, which can be vertically and horizontally distanced from one another. It can be apparent to the person skilled in the art that the layouts shown are only by way of example and unlimited variations can be possible.

The endless drive member 20 can be, for example, a chain or a belt to which a plurality of supporting elements can be mounted such that the supporting elements 24 can be driven by the drive member 20. Carriers 3 can be transferred onto or off the supporting elements 24 at the stations 10, 12, wherein, in the embodiment shown, the stations 10, 12 can be mounted along the conveyor pathway such that the transfer can be effected in regions in which the supporting elements 24 can be moved in a substantially vertical direction.

Figure 4:
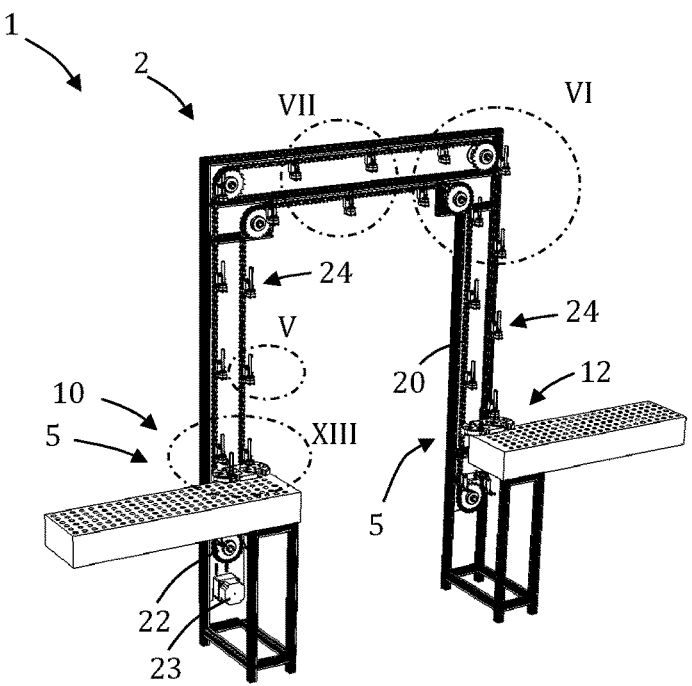
FIG. 4 illustrates a laboratory distribution system according to the layout of FIG. 2 according to an embodiment of the present disclosure.
Figure 8:
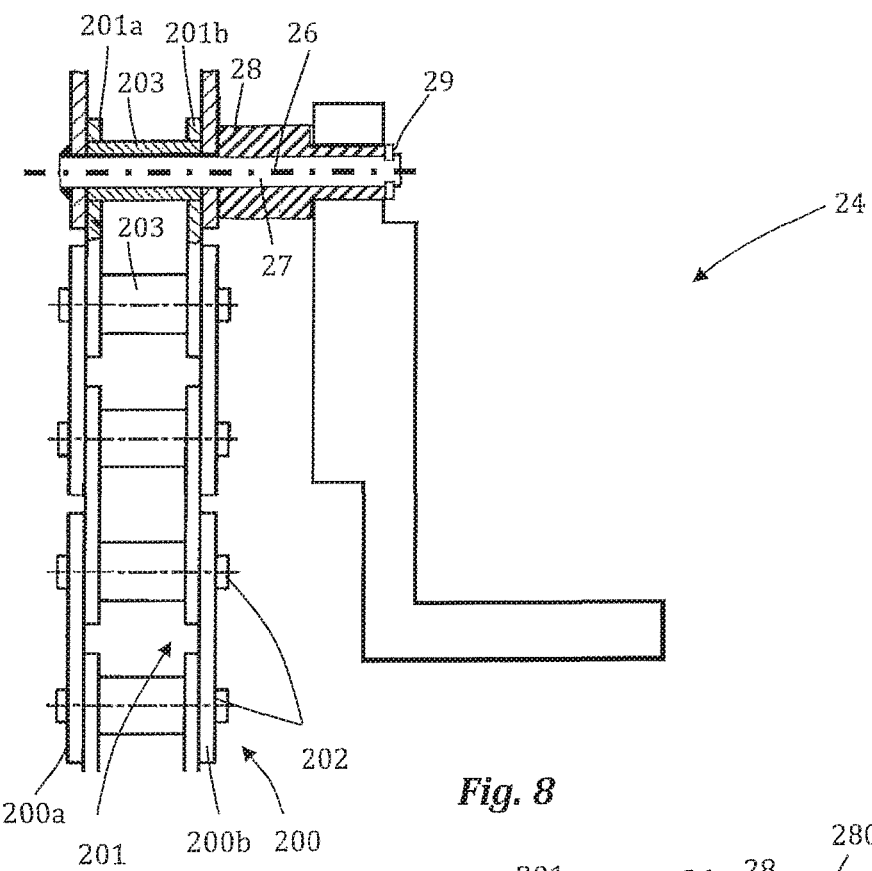
FIG. 8 illustrates a side view of a detail of the laboratory distribution system similar to FIG. 5 according to an embodiment of the present disclosure.

FIG. 4 shows an embodiment of a laboratory distribution system 1 with a layout similar to FIG. 2, wherein the endless drive member 20 can be a chain, and wherein a plurality of supporting elements 24 can be mounted pivotally about a substantially horizontal pivot axis to the drive member 20. FIGS. 5 to 7 and FIG. 13 show details of FIG. 4. FIG. 8 shows a side view of a detail of the laboratory distribution system similar to FIG. 5.

As shown in FIG. 4, the endless drive member 20 can be driven by a motor 23 driving one of the sprockets 22 arranged underneath one station 10. The chain can be driven by the motor 23 to move in either direction. In the embodiment shown, between the sprockets 22, the chain 20 can be guided by linear guiding rails 25. In the embodiment shown, the chain 20 can be guided at its two sides extending substantially perpendicular to chain links 200. For this purpose, in the embodiment shown, the guiding rails 25 can each be provided with a guide-groove in which the chain can be guided. In other embodiments, two parallel guide bars can be provided.

The supporting elements 24 can be configured for receiving diagnostic laboratory container carriers 3 (also referred to as carriers 3). In the embodiment shown, one sample tube 4 can be retained in each carrier 3. Of course, it may also be possible to convey empty diagnostic laboratory container carriers 3. In the embodiment shown, diagnostic laboratory container carriers 3 can be transferred onto one of the plurality of supporting elements 24 or off one of the plurality of supporting elements 24 at the stations 10, 12. For this purpose, at the two stations 10, 12 transfer devices 5 can be provided. Of course, if required, additional stations may be provided for transferring carriers onto one of the plurality of supporting elements 24 or off one of the plurality of supporting elements 24 at different positions along the conveyor pathway. All stations can be arranged along the conveyor pathway such that the transfer can be carried out in regions in which the supporting elements 24 can be moved in a vertical direction.

Figure 5:
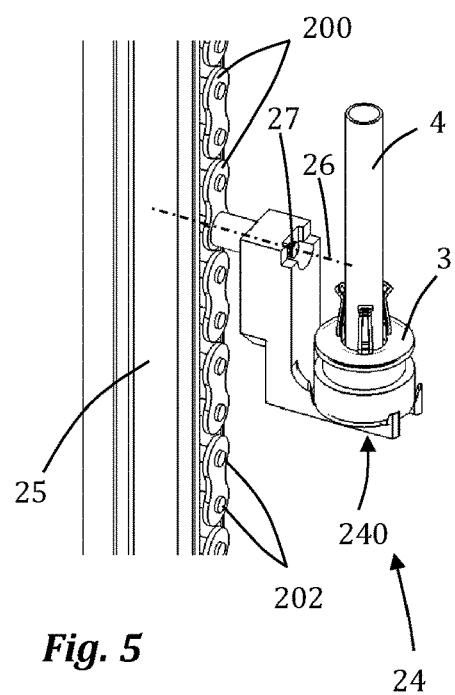
FIG. 5 illustrates detail V of FIG. 4 according to an embodiment of the present disclosure.
Figure 6:
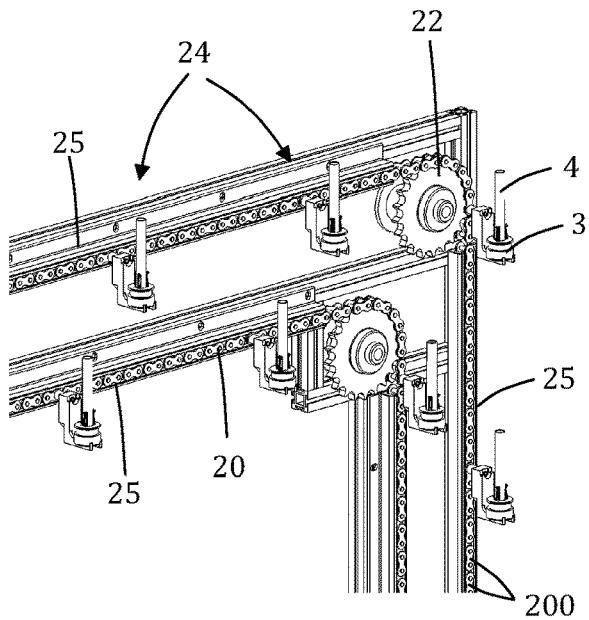
FIG. 6 illustrates detail VI of FIG. 4 according to an embodiment of the present disclosure.
Figure 7:
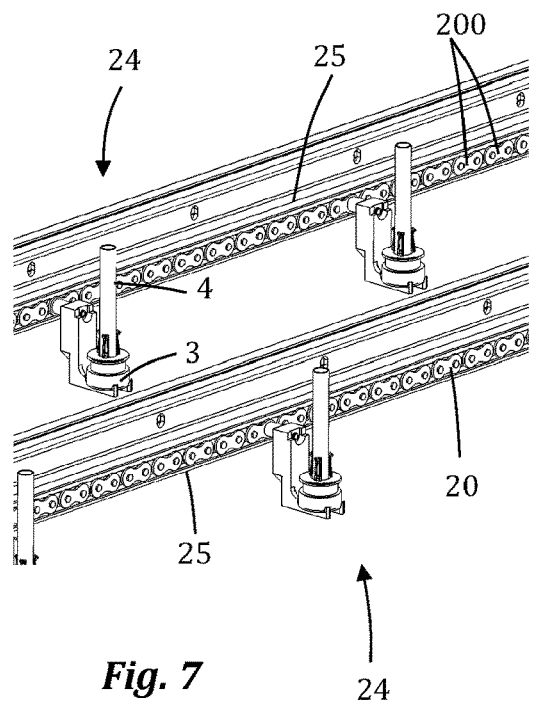
FIG. 7 illustrates detail VII of FIG. 4 according to an embodiment of the present disclosure.

As can be seen in FIG. 5, the supporting elements 24 can be mounted pivotally about a substantially horizontal pivot axis 26 to the chain. In the embodiment shown for sake of simplicity, the substantially horizontal pivot axis 26 can coincide with one of the axes of pins 202 of the chain links 200. In any position of the conveyor path, the substantially horizontal pivot axis 26 can always be substantially perpendicular to the movement direction of the endless drive member 20.

In the embodiment shown in FIGS. 4 to 7, the supporting elements 24 can each have a receiving area 240 for receiving one diagnostic laboratory container carrier 3. The receiving area 240 can be arranged below the pivot axis 26 when the supporting element 24 is in an upright use position as shown in FIGS. 4 to 7. The arrangement as well as the design of a body of the supporting element 24 can ensure that the center of gravity of the assembly comprising the supporting element 24, the diagnostic laboratory container carrier 3 and the sample tube 4 as well as of subgroups thereof can always be underneath the pivot axis 26 and in substantially vertical alignment with the pivot axis 26. Therefore, gravitational forces can be used for maintaining the supporting elements 24 with or without diagnostic laboratory container carriers 3 in the upright position.

The structure of the supporting elements 24 and the pivotal mounting of the supporting elements 24 to the drive member 20 can allow passively maintaining the supporting elements 24 by a gravitational force exerted by the gravitational field of the earth in an upright use position as shown in the FIGS. 4 to 7, while travelling along the conveyor path. This can allow conveying capped or otherwise closed sample tubes 4 as well as uncapped or open sample tubes 4 in an upright state along the entire conveyor path or along an arbitrary section of the conveyor path.

As best seen in FIG. 8, the chain can comprise two types of links 200, 201, namely outer links 200 and inner links 201, connected by pins 202. As generally known, the outer links 200 and inner links 201 can be arranged in alternation. The inner links 201, in the embodiment shown, can comprise two inner plates 201a, 201b held together by two sleeves 203. In an alternative embodiment, instead of separate sleeves 203, tubular elements can be formed integrally with the inner plates 201a, 201b for connecting the inner plates 201a, 201b. For reducing frictional forces in contact with the sprockets 22, additional rollers may be provided at the outer circumference of the sleeves 203. The outer links can comprise two outer plates 200a, 200b held together by the pins 202 passing through the sleeves 203. A subgroup of the pins 202 can be structured as extended pins 27 that project at one side of the drive chain 20 from the outer links 200. The supporting elements 24 can be pivotally mounted about a horizontal pivot axis 26 to the extended pins 27.

In the embodiment shown, the pins 202 and the extended pins 27 can be fixedly connected to the outer links 200. Hence, when moving along a conveyor path as shown in any one of FIGS. 1 to 4, the pins 202, 27 can also be rotated about the pivot axis 26. In other embodiments, the pin 27 can be connected fixed in rotation to the supporting element 24 and the pin 27 together with the supporting element 24 can rotate about the pivot axis 26.

In the embodiment shown in FIG. 8, a plain bearing can be provided for rotatably mounting the supporting element 24 to the chain, comprising the pin 27 and a bearing bush 28, which can be rotatably mounted on the pin 27. The bearing bush 28, in the embodiment shown, can be formed as a separate element mounted in a body of the supporting element 24. In other embodiments, the bearing bush 28 can be formed integrally with the body of the supporting element 24. The bearing bush 28 and the supporting element 24 can be axially mounted on the pin 27 by a retaining ring 29.

Figure 9:
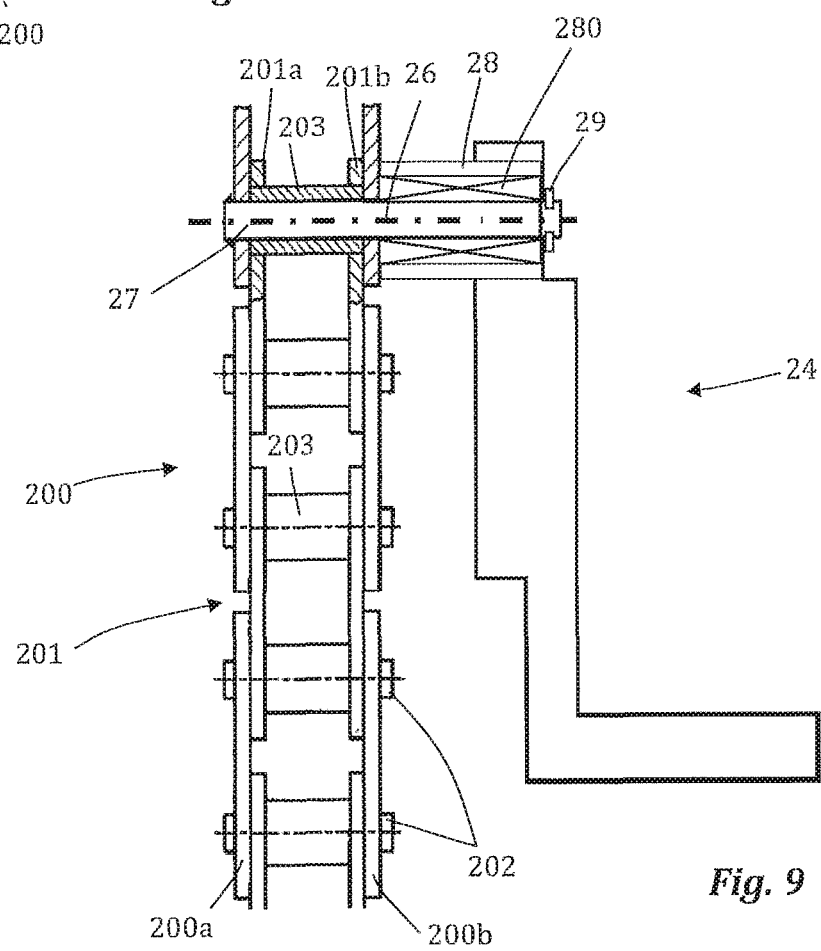
FIG. 9 illustrates a side view of a detail of an alternative laboratory distribution system similar to FIG. 8 according to an embodiment of the present disclosure.

FIG. 9 is a side view of a detail of an alternative laboratory distribution system similar to FIG. 8. For similar or same elements, the same reference numbers are used. In contrast to the embodiment shown in FIG. 8, the pivot bearing can be a rolling-element bearing such as, for example, a deep groove ball bearing 280 mounted to the body of the supporting element 24 by a bush 28.

Figure 10:
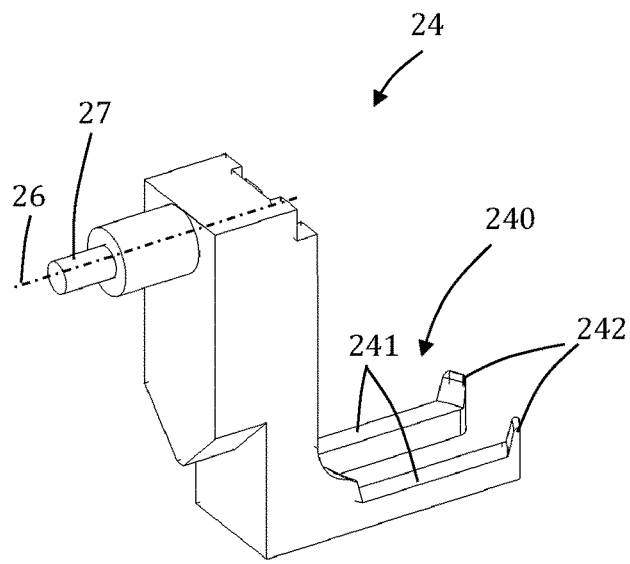
FIG. 10 illustrates a supporting element of the laboratory distribution system of FIG. 4 according to an embodiment of the present disclosure.
Figure 11:
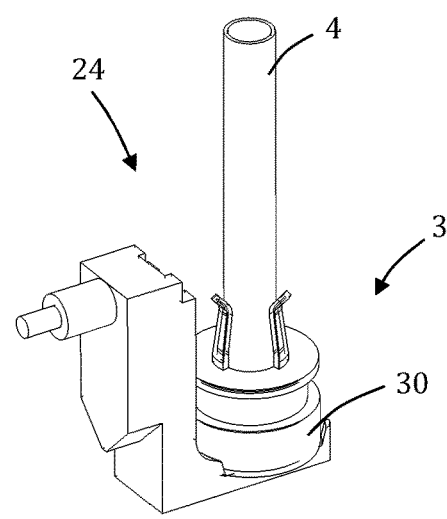
FIG. 11 illustrates the supporting element of FIG. 8 retaining a diagnostic laboratory container carrier according to an embodiment of the present disclosure.

FIGS. 10 and 11 show the supporting element 24 of the laboratory distribution system of FIG. 4 in isolation and retaining a diagnostic laboratory container carrier 3, respectively. The supporting element 24 is shown together with the pin 27. The supporting element 24 can be in the form of a fork having two fingers 241 together forming the receiving area 240. The fingers 241 of the supporting element 24 shown in FIGS. 10 and 11 can be provided with a boundary wall 242 configured to the circumferential shape of the base 30 of the diagnostic laboratory container carrier 3 for centering and retaining the diagnostic laboratory container carrier 3 as shown in FIG. 10 having a circular cylindrical base 30. In the embodiment shown, all stations 10, 12 (see FIGS. 1 to 4) can be arranged along the conveyor pathway in regions, in which the supporting elements 24 can be moved in a substantially vertical direction. The supporting element 24 can approach a diagnostic laboratory container carrier 3 from below for taking-over the diagnostic laboratory container carrier 3 as will be described below. Hence, the boundary wall 242 may not hinder a movement of the diagnostic laboratory container carrier 3 onto the receiving area 240 of the supporting element 24. By centering the diagnostic laboratory container carrier 3 in the receiving area 240, it can be ensured that a center of gravity of the supporting element 24 together with the diagnostic laboratory container carrier 3 can remain in substantially vertical alignment with the pivot axis 26.

Alternatively, or in addition to the boundary wall, in one embodiment, the supporting elements can be configured to apply a magnetic force and/or an electric field to the diagnostic laboratory container carrier 3 comprising at least one magnetically active device such as, for example at least one permanent magnet and/or an electroactive element. The magnetic force can allow for a reliable retaining of the diagnostic laboratory container carriers. Alternatively, or in addition, the supporting element may comprise an electroactive element made, for example, at least partly from an electroactive polymer. By applying the electric field, the electroactive element can be deformed or moved for gripping the diagnostic laboratory container carrier. Such a magnetic or electroactive retention system can also be advantageous in conveyor systems having an endless drive member and supporting elements, which may not be pivotally mounted and suitable, for example, to convey diagnostic laboratory container carriers along conveyor paths or conveyor path sections without any change in the direction.

Figure 12:
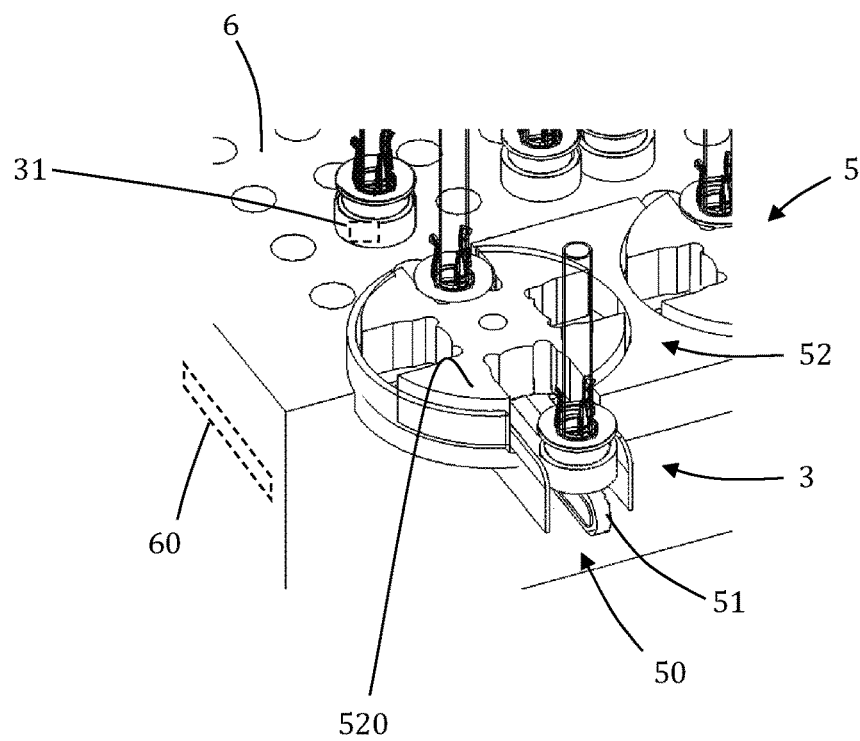
FIG. 12 illustrates a transfer device for transferring a diagnostic laboratory container carrier to the supporting element according to an embodiment of the present disclosure.

FIG. 12 shows an embodiment of a transfer device 5. The transfer device can be configured to cooperate with the supporting elements 24 for transferring one diagnostic laboratory container carrier 3 onto one of the supporting elements 24 and/or for taking-over one diagnostic laboratory container carrier 3 from one of the supporting elements 24.

The transfer device 5 can comprise a holding element 50 in the form of a jaw which can be arranged in a transfer position in the movement path of the supporting elements (not shown in FIG. 12). The jaw-shape of the holding element 50 can ber complementary to the fork-shape of the supporting elements 24 shown in FIGS. 4 to 11 allowing the supporting elements 24 to move past the holding element 50 arranged in the transfer position. More in particular, when approaching the holding element 50 with the supporting element 24 shown in FIG. 10 from below, the fingers 241 can pass by opposite sides of the holding element 50 and contact the diagnostic laboratory container carrier 3 for taking over the diagnostic laboratory container carrier 3 from the holding element 50. As will be understood by the person skilled in the art, the transfer can be carried out without stopping the endless drive member and at any position along the vertical section of the conveyor path.

Similar, for transferring the diagnostic laboratory container carrier 3 to the holding element 50, the supporting element 24 can approach the holding element 50 from above and the fingers 241 can pass by the holding element 50, thereby positioning the diagnostic laboratory container carrier 3 on the holding element 50.

In the embodiment shown in FIG. 12, the transfer device 5 can comprise a transfer belt 51 for moving the diagnostic laboratory container carrier 3 onto the holding element 50 and into a position configured for presenting the diagnostic laboratory container carrier 3 to the supporting element 24.

The laboratory distribution system of FIG. 4 can be combined with other distribution systems, for example comprising conveyor belts, screw conveyors or rails. In the embodiment shown in FIG. 12, the transfer device 5 can be provided at a periphery of a transport plane 6. The transport plane 6 can be configured to carry a plurality of diagnostic laboratory container carriers 3. In one embodiment, the diagnostic laboratory container carriers 3 can each comprise at least one magnetically active device such as, for example, at least one permanent magnet as schematically indicated by a dashed line 31 in FIG. 12. Further, a plurality of electro-magnetic actuators schematically indicated by a dashed line 60 in FIG. 12 can be stationary arranged below the transport plane 6. The electro-magnetic actuators 60 can be configured to move the diagnostic laboratory container carriers 3 along the top of the transport plane 6 by applying a magnetic force to the diagnostic laboratory container carriers.

The transfer device 5 shown in FIG. 12 can be configured for singling out diagnostic laboratory container carriers 3 conveyed along the top of the transport plane 6 prior to presenting one diagnostic laboratory container carrier 3 to the conveyor device 2. For this purpose, a carousel 52 can be provided, having a disc 520 which can be rotated to move singular diagnostic laboratory container carriers 3 onto the transfer belt 51. Next, by the transport belt 51, the diagnostic laboratory container carrier 3 can be moved into the conveyor path for presenting the diagnostic laboratory container carrier 3 to the supporting elements 24 (see FIGS. 4 to 11).

FIG. 13 shows a detail XIII of FIG. 4 showing an embodiment of laboratory distribution system 1 having an alternative transfer device 5. FIGS. 14 and 15 schematically show a top view of the transfer device 5 of FIG. 13 during take-over and at idle times, respectively. The transfer device 5 shown in FIG. 13 can comprise two carousels 52, each carousel 52 having a disc 520, which can be rotated to move a single diagnostic laboratory container carrier 3 into a presenting position in the movement path of the supporting elements 24 or out of the movement path of the supporting elements 24. The discs 520 shown can each have four recesses 521 for receiving the diagnostic laboratory container carriers 3. The transfer device 5 can comprise stationary arranged holding elements 50 supporting the base surface of the diagnostic laboratory container carrier 3 when arranged in the presenting position in the movement path of the supporting elements 24. The discs 520 can be rotated to move the diagnostic laboratory container carrier 3 onto or off the holding elements 50.

In the embodiment shown, the holding element 50 can be in the form of a jaw which can be arranged in a transfer position in the movement path of the supporting elements 24. The jaw-shape of the holding element 50 can be complementary to the fork-shape of the supporting elements 24 shown in FIG. 14 having two fingers 241. The shape of the holding elements 50 can be chosen so that an interference with the supporting elements 24 can be avoided, allowing empty supporting elements 24 moving in a substantially vertical direction to pass by the holding element 50 without any interference. For this purpose, as best seen in FIG. 15, the holding elements 50 and the disc 520 can be provided with cutouts 500, 522, respectively, allowing the supporting element 24 shown in FIGS. 10 and 11 to pass by. When approaching the holding element 50 with the supporting element 24 from below, the fingers 241 can pass by opposite sides of the holding element 50 and contact the carrier 3 for taking over the carrier 3 from the holding element 50. As will be understood by the person skilled in the art, the transfer can be carried out at any position along the vertical section of the conveyor path.

Similar, for transferring the carrier 3 to the holding element 50, the supporting element 24 can approach the holding element 50 from above and the fingers 241 can pass by the holding element 50, thereby positioning the carrier 3 on the holding element 50.

FIG. 16 is a schematic side view of a system 1 similar to FIGS. 13 to 15. In contrast to FIGS. 13 to 15, the diagnostic laboratory container carriers 3 may not be placed on a holding element supporting the base surface of the diagnostic laboratory container carrier 3 when arranged in the presenting position in the movement path of the supporting elements 24. Rather, the discs 520 of the carousels 52 can function as holding elements. For this purpose, a rim 32 of the diagnostic laboratory container carrier 3 can be placed on a top surface of the discs 520 in the periphery of the recess 521 when rotating the discs 520 to move the diagnostic laboratory container carriers 3 into the movement path of the supporting elements 24. The height of the discs 520 can be chosen so that when moving the diagnostic laboratory container carrier 3 over the top of the transfer plane 6 and/or over a housing 53 of the transfer device 5 into a recess 521, the rim 32 can be arranged with a small distance to the upper surface of the discs 520.

When rotating the disc 520 by, for example, about 180°, the diagnostic laboratory container carrier 3 can be moved into the movement path of the supporting elements 24, wherein upon the rotation, the diagnostic laboratory container carrier 3 can be removed from an inclined upper surface of a housing 53 while being held at the rim 32 by the disc 520. After the rotation, the supporting element 24 can be approached from below for taking-over the diagnostic laboratory container carrier 3. Similar, a diagnostic laboratory container carrier 3 supported by a supporting element 24 approached from above can be transferred to the disc 520. The disc 520 can then be rotated placing the diagnostic laboratory container carrier 3 back on the upper surface of the housing 53, wherein the inclined surface can allow for a smooth transition.

Figure 17:
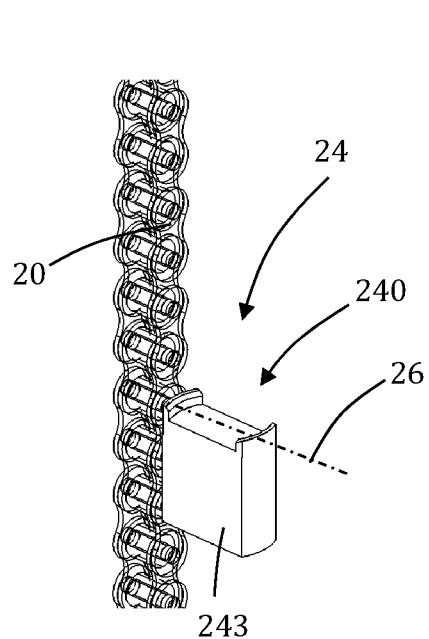
FIG. 17 illustrates a first alternative embodiment of a supporting element of the laboratory distribution system of FIG. 4 according to an embodiment of the present disclosure.

FIG. 17 shows an alternative embodiment of a supporting element 24 mounted pivotally about a horizontal pivot axis 26 to an endless drive member 20 in the form of a chain. The supporting element 24 can be in the form of a substantially rectangular solid and can be arranged with a short side facing the chain so that the supporting element 24 can protrude like a jaw from the chain. A holding element (not shown in FIG. 17) for presenting a diagnostic laboratory container carrier 3 to the supporting element 24 can have, for example, the shape of a fork having two fingers, wherein the supporting element 24 can pass between the fingers for transferring a diagnostic laboratory container carrier 3 to or off the holding element. A retaining area 240 can be approximately at the same level as the pivot axis 26. The supporting element 24 can be provided with a counterweight 243 arranged below the pivot axis 26 when the supporting element 24 is in the upright use position shown in FIG. 17 for maintaining the supporting element 24 in the upright use position while travelling along the conveyor path and avoiding that a loaded supporting element 24 rolls over.

Figure 18:
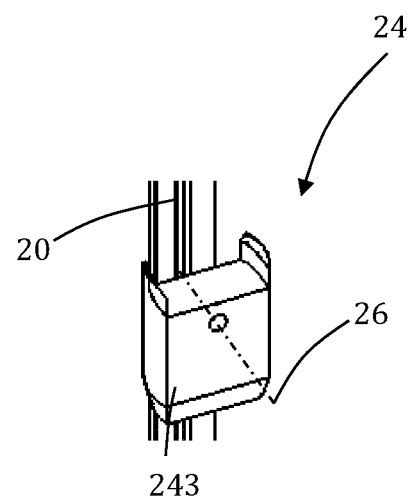
FIG. 18 illustrates a second alternative embodiment of a supporting element of the laboratory distribution system of FIG. 4 according to an embodiment of the present disclosure.

FIG. 18 shows another alternative embodiment of a supporting element 24 mounted pivotally about a horizontal pivot axis 26 to an endless drive member 20 in the form of a belt. The supporting element 24 is similar to the supporting element 24 shown in FIG. 17 and is also provided with a counterweight 243 arranged below the pivot axis 26 when the supporting element 24 is in the upright use position shown in FIG. 18. In contrast to FIG. 17, the supporting element 24 shown in FIG. 18 can be arranged with a long side facing the belt. It can be understood by the person skilled in the art that the supporting element 24 shown in FIG. 18 can also be attached to an endless drive member 20 in the form of a chain and the supporting element 24 shown in FIG. 17 can likewise be attached to an endless drive member 20 in the form of belt.

Figure 19:
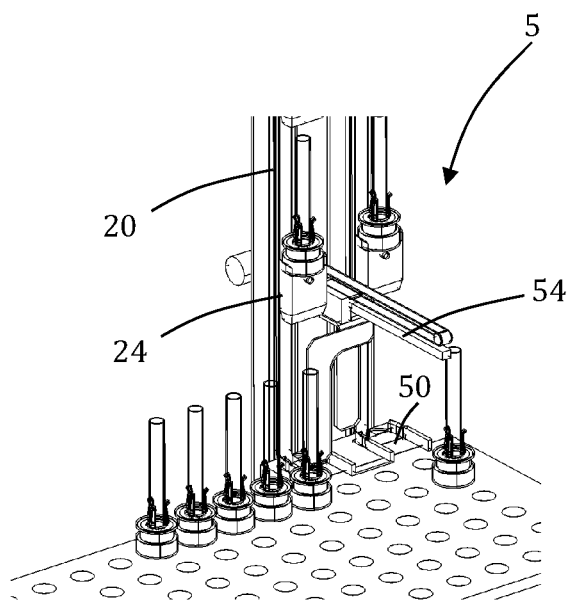
FIG. 19 illustrates a transfer device comprising a pusher according to an embodiment of the present disclosure.
Figure 20:
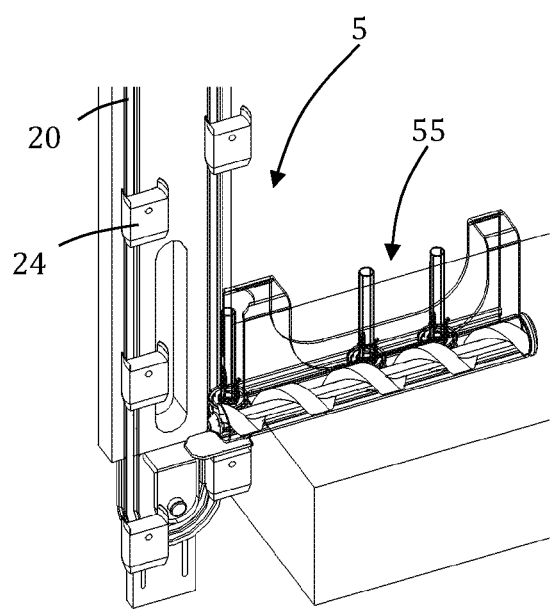
FIG. 20 illustrates a transfer device comprising a screw conveyer according to an embodiment of the present disclosure.

FIGS. 19 and 20 show two embodiments of transfer devices 5 for transferring diagnostic laboratory container carriers 3 onto supporting elements 24 of FIG. 18 and/or for taking-over diagnostic laboratory container carriers 3 from the supporting elements 24.

The transfer device 5 shown in FIG. 19 can comprise a stationary arranged holding element 50 and a pusher 54 for pushing a diagnostic laboratory container carrier 3 off the holding element 50. Likewise, a pusher can be provided for pushing diagnostic laboratory container carrier 3 onto a holding element 50.

The transfer device 5 shown in FIG. 20 can comprise a stationary arranged holding element (not visible in FIG. 20) and a screw conveyor 55 for conveying diagnostic laboratory container carriers 3 to the holding element or off the holding element.

A shock reducing device can be provided for reducing a mechanical shock exerted on a payload such as, for example, a sample tube 4, retained by one of the carriers 3 when transferring the carrier 3 onto one of the supporting elements 24 or off one of the supporting elements 24 allowing to transfer the carriers 3 without stopping the drive member 20 and/or without disconnecting the supporting elements 24 from the drive member 20. It can be understood by the person skilled in the art, that the shock reducing device can be combined with the pivotally mounted supporting elements shown in FIGS. 4 to 20 as well as with other systems as described, for example, in US 2015/0276778 A1, which is hereby incorporated by reference.

Figure 21:
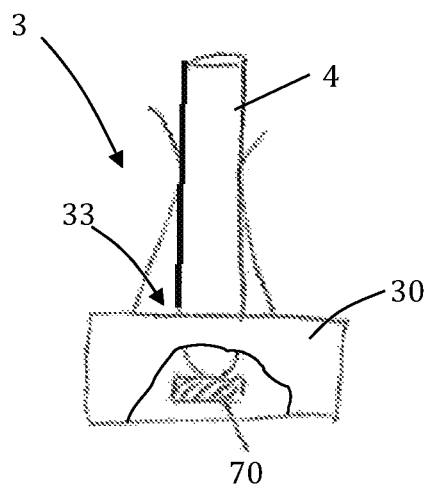
FIG. 21 illustrates a first embodiment of a carrier for a laboratory distribution system with a carrier-side shock absorbing element according to an embodiment of the present disclosure.
Figure 22:
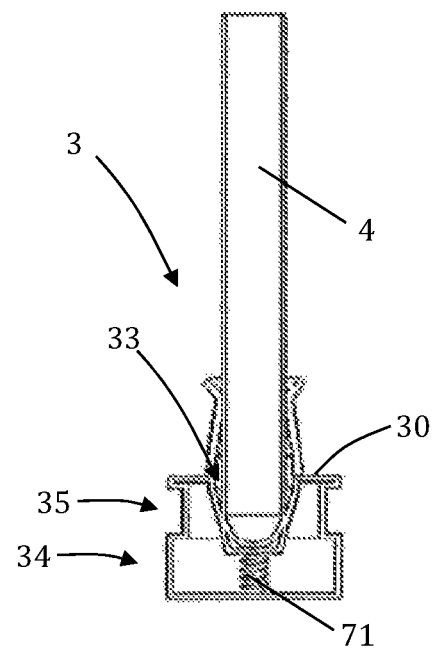
FIG. 22 illustrates a second embodiment of a carrier for a laboratory distribution system with a carrier-side shock absorbing element according to an embodiment of the present disclosure.
Figure 23:
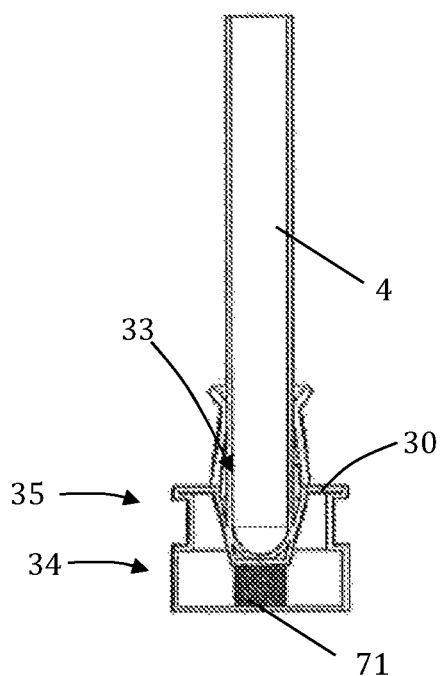
FIG. 23 illustrates a third embodiment of a carrier for a laboratory distribution system with a carrier-side shock absorbing element according to an embodiment of the present disclosure.

In one group of embodiments shown in FIGS. 21 to 23, the shock reducing device can comprise carrier-side shock absorbing elements 70, 71 made of a shock absorbing material having elastic and/or damping properties. The carrier-side shock absorbing elements 70, 71 can be provided at each of the carriers 3.

FIG. 21 shows a first embodiment of a diagnostic laboratory container carrier 3 provided with a carrier-side shock absorbing element 70. In the embodiment shown in FIG. 21, the carrier-side shock absorbing element 70 can be arranged inside a retaining area 33 of a base 30 of the carrier 3. The retaining area 33 can be configured to receive a sample tube 4. The carrier-side shock absorbing element 70 can be placed in such way that at least a part of a contact portion of the retaining area 33, in which contact portion can be configured for contacting the sample tube 4, can be made of or equipped with the carrier-side shock absorbing element 70. In use, the sample tube 4 can contact the carrier-side shock absorbing element 70 with its lower end as shown in FIG. 21. Hence, any shock exerted on the bottom of the base 30 when transferring the diagnostic laboratory container carrier 3 from the holding element 50 (see for example FIG. 13) onto a moving supporting element 24 (see FIG. 13) or from a moving supporting element 24 onto the holding element 50 may not be transferred to the sample tube 4. The carrier-side shock absorbing element 70 can be made, for example, from a foam rubber.

FIGS. 22 and 23 show a second and third embodiment of a diagnostic laboratory container carrier 3 provided with a carrier-side shock absorbing element 71. In the embodiments shown in FIGS. 22 and 23, in each case a bottom part 34 of the base 30, in which bottom part 34 can be arranged below the retaining area 33, can be equipped with a carrier-side shock absorbing element 71. To allow an isolation of the retaining area 33 from the bottom part 34, the bottom part 34 can be moveable within limits with respect to an upper part 35 of the base 30, in which the upper part 35 can comprise the retaining area 33. In the embodiment shown in FIG. 22, the carrier-side shock absorbing element 71 can be a spring, which can have elastic and damping properties. In the embodiment shown in FIG. 23, the carrier-side shock absorbing element 71 can be an elastomer damper. It will be apparent to the person skilled in the art that a plurality of identical or different carrier-side shock absorbing element 71 can be combined in one carrier 3.

Alternatively, or in addition, to the carrier-side shock absorbing elements 70, 71, the shock reducing device, in one embodiment, can comprise transfer-device shock absorbing elements 72, 73 (see FIGS. 24 to 26) having elastic and/or damping properties for reducing a mechanical shock exerted on the carrier 3 and, thus, also on a sample tube 4 retained by the carrier 3, when transferring the carrier 3 from a moving supporting element 24 onto a holding element 50 of the transfer device 5 (see FIG. 13), and/or supporting-element-side shock absorbing elements 74, 75, 76 (see FIGS. 27 to 30) having elastic and/or damping properties for reducing a mechanical shock exerted on the carrier 3 when transferring the carrier 3 from the holding element 50 onto the moving supporting element 24.

Figure 24:
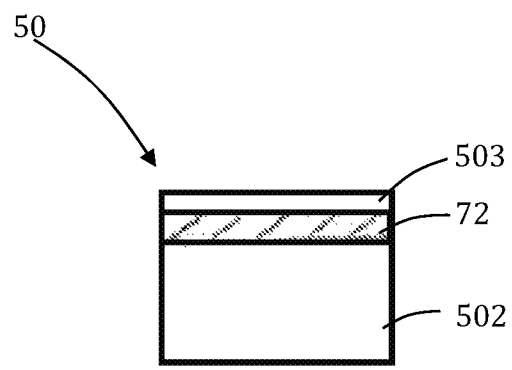
FIG. 24 illustrates a schematic sectional view showing the structure of a holding element of the transfer device of FIG. 13 according to an embodiment of the present disclosure.

FIG. 24 schematically shows a sectional view of the holding element 50 of the transfer device 5 of FIGS. 13 to 15 according to one embodiment. In the embodiment shown in FIG. 24, a transfer-device shock absorbing element 72 having elastic and/or damping properties, for example, an elastomer damper, can be arranged between a main body 502 of the holding device 50 and a top surface 503 of the holding device 50.

Figure 25:
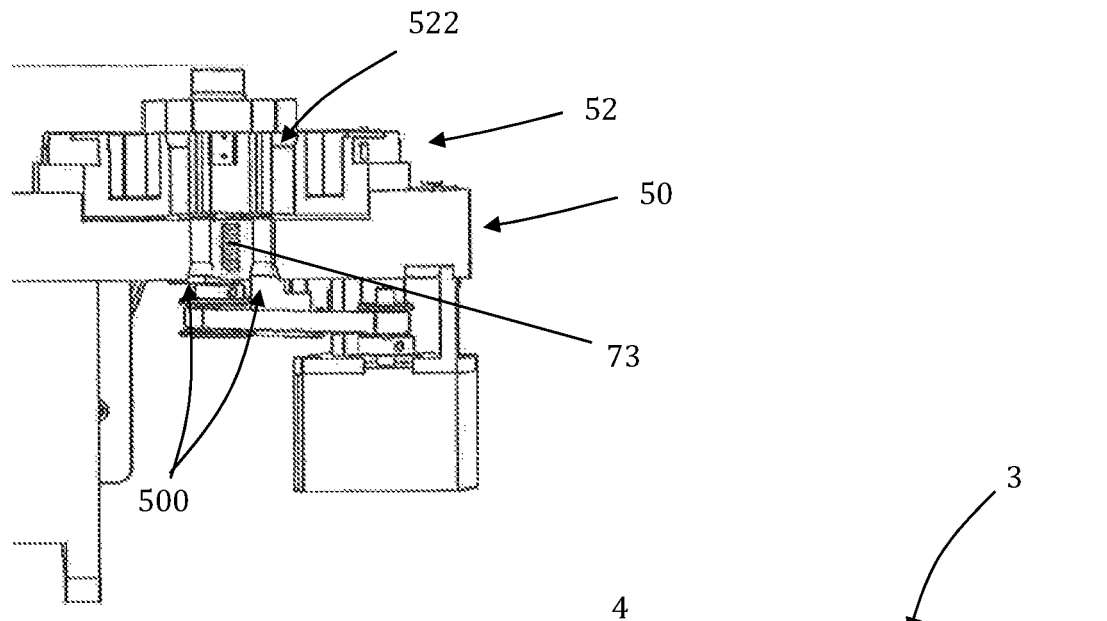
FIG. 25 illustrates a schematic side view of an alternative embodiment of transfer device of FIG. 13 with a resiliently mounted holding element according to an embodiment of the present disclosure.

FIG. 25 shows an alternative embodiment of the transfer device 5 of FIGS. 13 to 15, wherein the holding element 50 can be mounted moveable within limits in the vertical direction with respect to an environment, for example, with respect to a transport plane 6 (see FIG. 13), by at least one transfer-device shock absorbing element 73. In FIG. 25, the transfer-device shock absorbing element 73 is depicted as a spring. However, it can be understood by the person skilled in the art that different transfer-device shock absorbing element 73 can be provided for resiliently mounting the holding element 50.

Figure 26:
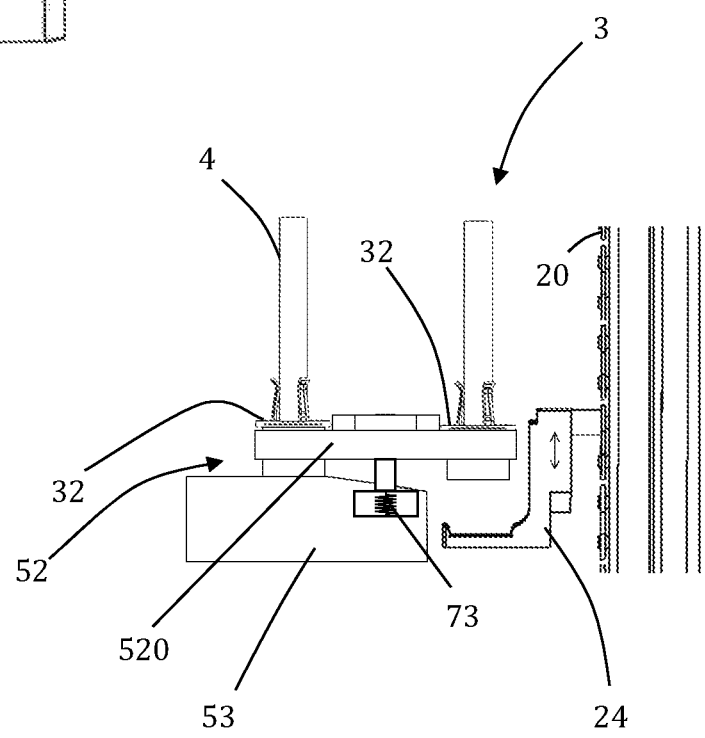
FIG. 26 illustrates a schematic side view of an alternative embodiment of transfer device similar to FIG. 16 with a resiliently mounted transfer disc according to an embodiment of the present disclosure.

FIG. 26 is a schematic side view of a laboratory distribution system 1 similar to FIG. 16, wherein the discs 520 of the carousels 52 can function as holding elements and the carriers 3 can be provided with a rim 32, in which the rim 32 can be placed on a top surface of the discs 520 in the periphery of the recess 521 (see FIGS. 13 to 15) when rotating the discs 520 to move the carriers 3 into or out of the movement path of the supporting elements 24. In the embodiment shown in FIG. 26, the disc 520 can be mounted resiliently by a transfer-device shock absorbing element 73. In an alternative embodiment, similar to FIG. 24 a transfer-device shock absorbing element 73 can be provided at an area of the disc 52 configured for holding of the carrier 3.

Alternatively, or in addition, to the carrier-side shock absorbing elements 70, 71 and/or the transfer-device shock absorbing elements 72, 73, the shock reducing device, in one embodiment, can comprise supporting-element-side shock absorbing elements 74, 75, 76.

FIGS. 27 to 30 show schematic side views of four embodiments of supporting elements 24 comprising supporting-element-side shock absorbing elements 74, 75, 76.

Figure 27:
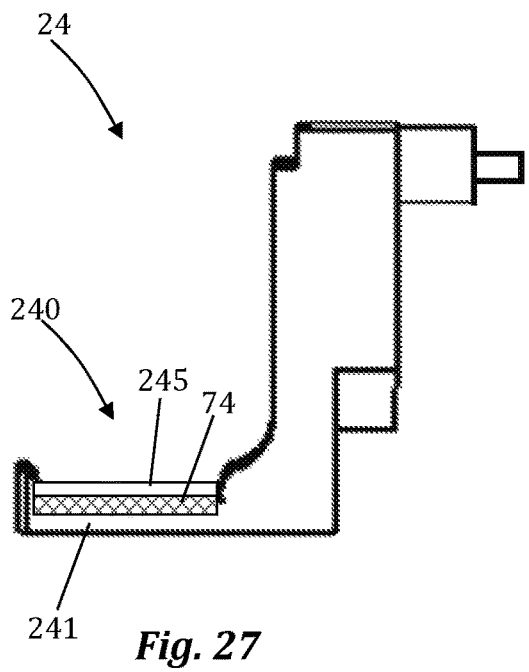
FIG. 27 illustrates a schematic side view showing a supporting element with a supporting-side shock absorbing element according to a first embodiment of the present disclosure.

In the embodiment shown in FIG. 27, the receiving area 240, more particular the fingers 241 for receiving and holding a received carrier 3 (see FIG. 5) of each supporting element 24 can be equipped with a supporting-element-side shock absorbing element 74. In the embodiment shown, a contact surface element 245 is placed above the supporting-element-side shock absorbing element 74. In other embodiments, the supporting-element-side shock absorbing element 74 can form a contact surface for the carriers 3.

Figure 28:
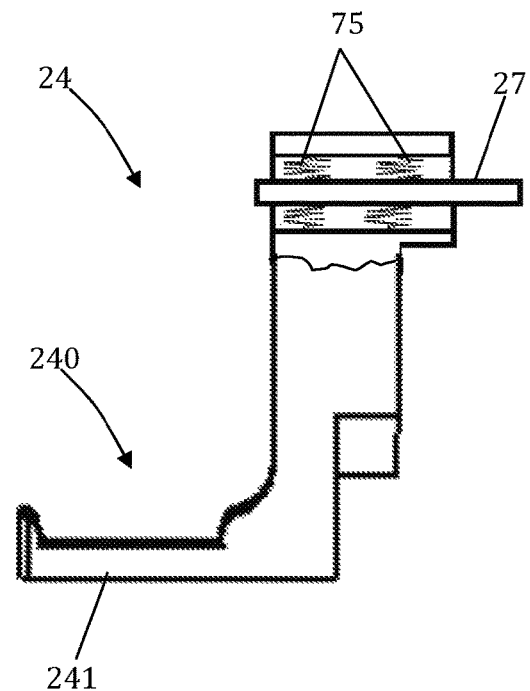
FIG. 28 illustrates a schematic side view showing a supporting element with a supporting-side shock absorbing element according to a second embodiment of the present disclosure.

Alternatively, or in addition, in the embodiment shown in FIG. 28, the supporting elements 24 can be resiliently mounted to the pin 27, in which the pin 27 can be connected to the drive member 20 (see FIG. 8), by one or more supporting-element-side shock absorbing element 75. A stiffness of the supporting-element-side shock absorbing element 75 can be chosen suitably by the person skilled in the art in order to avoid an uncontrolled movement of the supporting elements 24 at least when holding a carrier 3 during conveyance along the conveyor path after the transfer.

Figure 29:
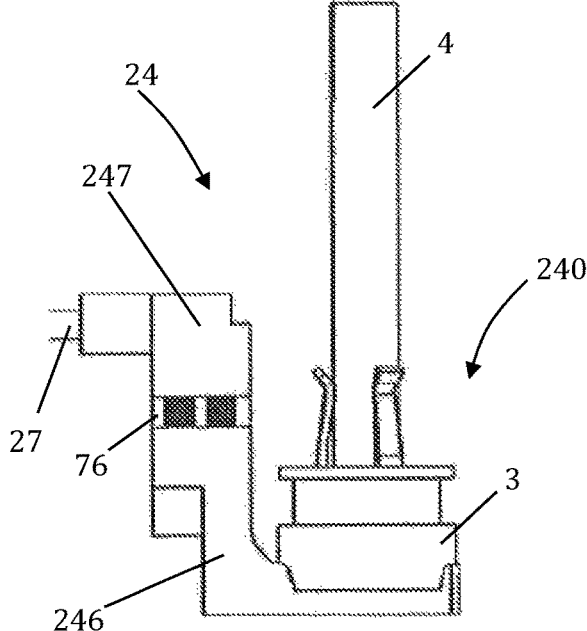
FIG. 29 illustrates a schematic side view showing a supporting element with a supporting-side shock absorbing element according to a third embodiment of the present disclosure.
Figure 30:
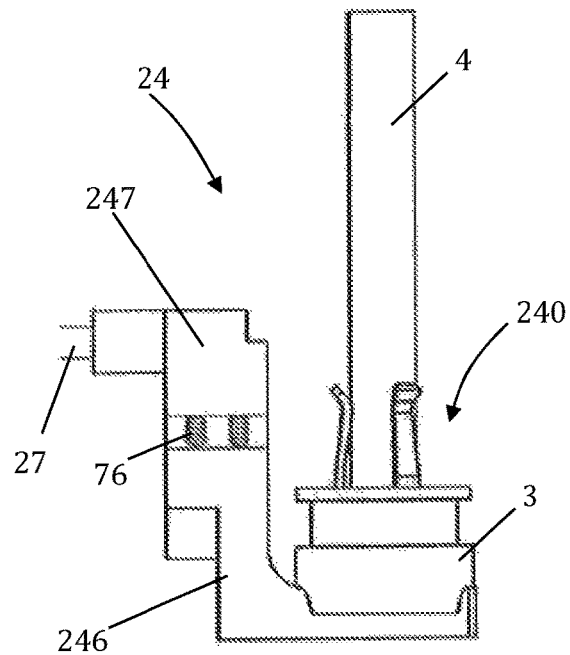
FIG. 30 illustrates a schematic side view showing a supporting element with a supporting-side shock absorbing element according to a fourth embodiment of the present disclosure.

FIGS. 29 and 30 show two embodiments of a supporting element 24 having a first part 246 comprising the receiving area 240 and a second part 247. The first part 246 and the second part 247 can be connected moveable relative to each other in the substantially vertical direction by one or more supporting-element-side shock absorbing elements 76.

Figure 31:
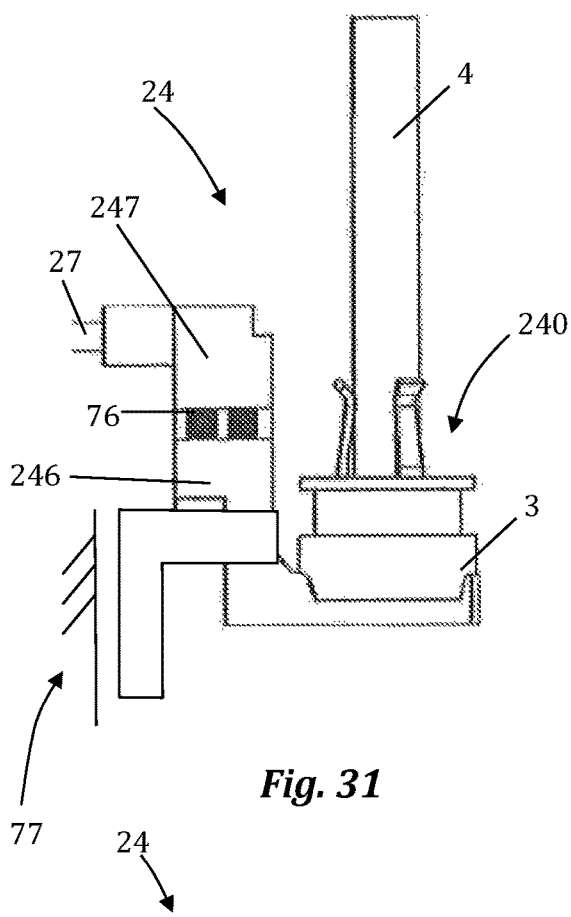
FIG. 31 illustrates a schematic side view showing a supporting element and a supporting element acceleration and/or deceleration device in a first state during a transfer of a carrier to the supporting element according to an embodiment of the present disclosure.
Figure 32:
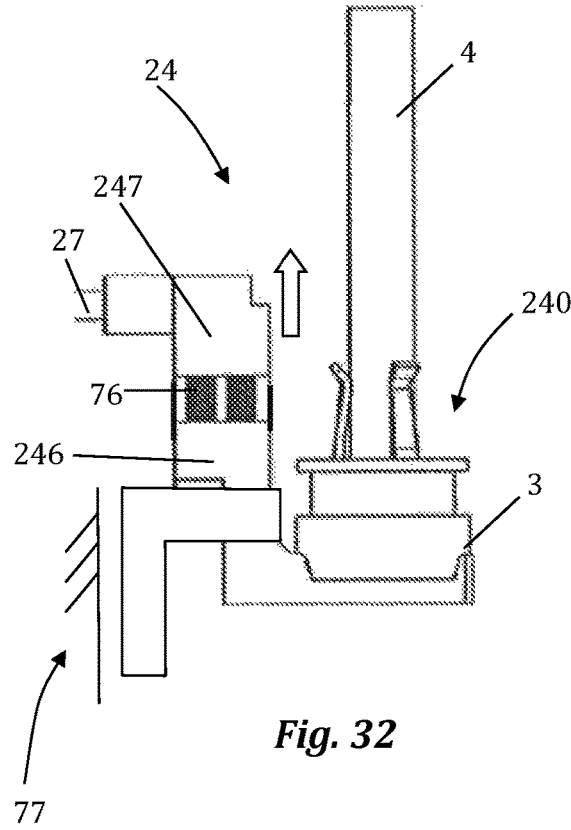
FIG. 32 illustrates a schematic side view showing the supporting element and the supporting element acceleration and/or deceleration device of FIG. 31 in a second state during a transfer of the carrier to the supporting element according to an embodiment of the present disclosure.

FIGS. 31 and 32 show in two different states a further embodiment. The shock reducing device can comprise supporting-element-side shock absorbing elements 76, by which two parts 246, 247 of the supporting elements 24 can be connected in a substantially vertical direction as shown in FIGS. 29 and 30. In the embodiment of FIGS. 31 and 32, the shock reducing device can further comprise a supporting element acceleration and/or deceleration device 77. The supporting element acceleration and/or deceleration device 77 can be configured for accelerating and/or decelerating the first part 246 of the supporting element 24 relative to the pin 27 by which the supporting element 24 can be connected to the drive member 20 (see FIGS. 1 to 4) when transferring one carrier 3 onto the supporting element 24 or off the supporting element 24. As schematically shown in FIGS. 31 and 32, by the acceleration and/or deceleration device 77, the first part 246 of the supporting element 24 can be stopped or decelerated to a very slow motion when transferring a carrier 3 onto the supporting element 24 or off the supporting element 24, while continuing a movement of the drive member 20. Hence, as shown in FIG. 32 the second part 247 of the supporting element 24 can be moved with respect to the first part 246 of the supporting element 24 in a substantially vertical direction indicated by an arrow. After completing the transfer, the first part 246 of the supporting element 24 can be accelerated to the speed of the drive member 20 and moved into a neutral mounting position with respect to the second part 247.

In an alternative embodiment, a carrier acceleration and/or deceleration device can be provided. The carrier acceleration and/or deceleration device can be configured for accelerating and/or decelerating one of the plurality of carriers 3 relative to the drive member 20 when transferring the carrier 3 onto one of the plurality of supporting elements 24 or off one of the plurality of supporting elements 24. In other words, by the carrier acceleration and/or deceleration device, a carrier 3 can be accelerated using an appropriate acceleration profile avoiding any sharp rises or falls and taken-over by the supporting elements 24 after being accelerated to the desired speed. Similarly, by the carrier acceleration and/or deceleration device, a carrier 3 can be taken-over from the supporting elements 24, decelerated using an appropriate deceleration profile avoiding any sharp rises or falls and transferred with a low speed to an adjacent transport plane 6 or any other device.

Figure 33:
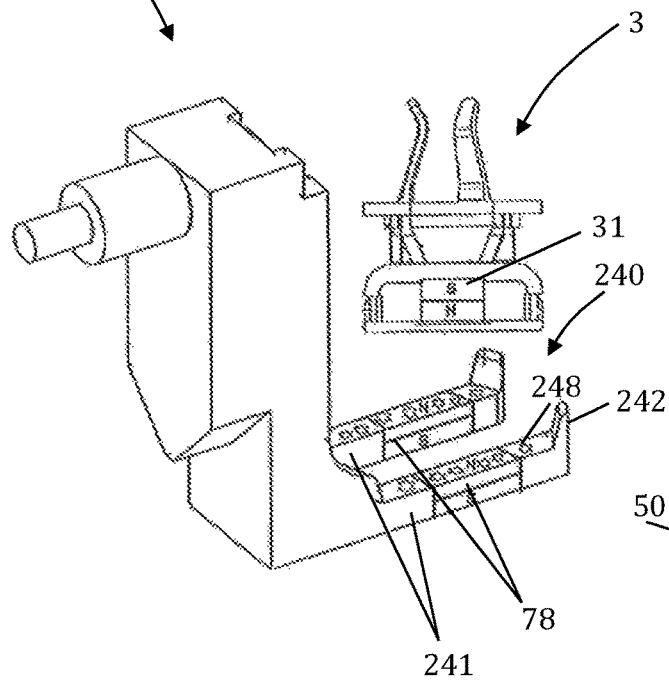
FIG. 33 illustrates a schematic view of a support element and a carrier of a further embodiment of a laboratory distribution system with magnetically active elements according to an embodiment of the present disclosure.

FIG. 33 shows a further embodiment of a laboratory distribution system comprising carriers 3, a conveyor device with supporting elements 24 configured for receiving one carrier 3 and for transporting the carrier 3 along a conveyor pathway, and a shock reducing device with magnetically active elements 31, 78. More particular, FIG. 33 shows one supporting element 24 comprising two magnetically active elements 78, wherein one magnetically active element 78 can be provided at each finger 241 of the supporting element 24 and one carrier 3 comprising a magnetically active element 31 of such a laboratory distribution system.

In one embodiment, the magnetically active element 31 of the carrier 3 can be a permanent magnet. The magnetically active element 31 can be also used to transport the carrier 3 on the transport plane 6 (see FIG. 13) as known in the prior art.

In one embodiment, the magnetically active elements 78 provided at the fingers 241 can also be permanent magnets, wherein the permanent magnet of the carrier 3 and the permanent magnet arranged at the fingers 241 can be arranged to repel each other. In this case, the magnetic field of the magnet on the fingers 241 in some embodiments can be chosen sufficiently weak in order to avoid a lifting of the carrier 3. The permanent magnets can be chosen such that the gravitational force acting on the carrier 3 can be higher than the magnetic force acting on the carrier 3 in the opposite direction. The magnetically active elements 31, 78 can achieve a damping effect for reducing a mechanical shock exerted on the carrier 3 upon moving the carrier 3 onto the supporting element 24. In order to avoid a horizontal slip or rotation of the carrier 3 during a transport thereof on the supporting element 24 due to the magnetically active elements 78, in one embodiment, the fingers 241 can be provided with an anti-slip surface coating 248.

Figure 34:
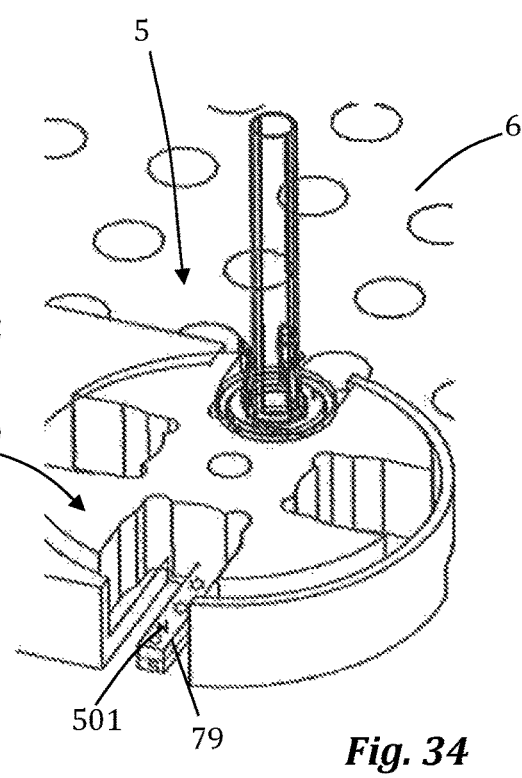
FIG. 34 illustrates a schematic view of a transfer device for the laboratory distribution system of FIG. 33 according to an embodiment of the present disclosure.

FIG. 34 shows a transfer device 5 for a laboratory distribution system shown in FIG. 33 comprising a holding element 50 with a jaw 507. In accordance with the embodiment shown, the jaw 507 can be provided with a magnetically active element 79. Similar to the magnetically active elements 78 provided at the fingers 241, in one embodiment, the magnetically active element 79 provided at the jaw 507 can be a permanent magnet, wherein the permanent magnet of the carrier 3 and the permanent magnet of the jaw 507 can be arranged to repel each other. In this case again, the permanent magnets can be chosen such that the gravitational force acting on the carrier 3 can be higher than the magnetic force acting on the carrier 3 in the opposite direction.

Alternatively, or in addition, in one embodiment, the magnetically active elements 78 provided at the fingers 241 and/or the magnetically active element 79 provided at the jaw 507 can be an electro-magnet or smart magnet, wherein a polarity of the magnetically active elements 78, 79 can be rapidly changed. In this case, the magnetically active elements 31 of the carriers 3 and the magnetically active elements 78 provided at the receiving area 240 of the supporting elements 24 can be arranged to repel each other when transferring the carrier 3 onto the supporting element 24 or off the supporting element 24 and to attract each other after a transfer is completed. Similar, the magnetically active elements 31 of the carriers 3 and the magnetically active element 79 provided at the jaw 507 can be arranged to repel each other when transferring the carrier 3 onto the holding element 50 or off the holding element 50 and to attract each other after a transfer is completed.

In the embodiment shown, the fingers 241 of the supporting element 24 can be provided with boundary walls 242. In the case where the supporting elements 24 are adapted to apply a magnetic force and/or an electric field to the carrier 3 comprising the magnetically active element 31, a boundary wall 242 may be omitted.

Alternatively, or in addition, the supporting element may comprise an electroactive element, made for example at least partly from an electroactive polymer, wherein by applying the electric field the electroactive element can be deformed or moved for gripping the carrier.

A laboratory distribution system for use in a laboratory automation system with a plurality of diagnostic laboratory container carriers and a conveyor device is presented. The conveyor device can comprise an endless drive member such as, for example, a belt or a chain, defining a closed-loop conveyor pathway and a plurality of supporting elements attached to the endless drive member. The supporting elements can be configured for receiving one diagnostic laboratory container carrier and for transporting the diagnostic laboratory container carrier in an upright position along at least a section of the conveyor pathway. The supporting elements can be each mounted pivotally about a horizontal pivot axis by a pivot bearing to the drive member and structured such that a center of gravity of the supporting element with or without an empty or loaded diagnostic laboratory container carrier can be arranged below and vertically aligned with the pivot axis when the supporting element is in an upright use position such that each supporting element can be free to pivot about the associated pivot axis under the effect of gravitational forces acting on the supporting element for maintaining an upright use position while travelling along the conveyor path.

The supporting elements can each be provided with a counterweight arranged below the pivot axis when the supporting element is in an upright use position. The supporting elements can have a receiving area for receiving one diagnostic laboratory container carrier. The receiving area can be arranged below the pivot axis when the supporting element is in an upright use position. The supporting elements can be provided with a boundary wall extending at least partly about the periphery of a receiving area for centering and retaining a diagnostic laboratory container carrier having a circular cylindrical base.

At least one linear extending guiding profile can be provided for guiding the endless drive member at least along a section of the closed-loop conveyor pathway.

The pivot bearing can be a plain bearing made up of at least two components. One component can be soft and the other component can be hard. The pivot bearing can be a rolling-element bearing such as, for example, a deep groove ball bearing.

The drive member can be a drive chain comprising a plurality of links connected by pins. A subgroup of the pins can be structured as extended pins projecting at one side of the drive chain from the links. Each supporting element can be pivotally mounted to one extended pin.

A laboratory distribution system for use in a laboratory automation system with a plurality of diagnostic laboratory container carriers and a conveyor device is presented. The conveyor device can comprise an endless drive member such as, for example, a belt or a chain, defining a closed-loop conveyor pathway and a plurality of supporting elements attached to the endless drive member. The supporting elements can be configured for receiving at least one diagnostic laboratory container carrier and for transporting the at least one diagnostic laboratory container carrier in an upright position along at least a section of the conveyor pathway. A shock reducing device can be provided for reducing a mechanical shock exerted on a payload retained by one of the plurality of diagnostic laboratory container carriers when transferring the at least one diagnostic laboratory container carrier onto one of the number of supporting elements or off one of the number of supporting elements without stopping the drive member and/or disconnecting the supporting elements from the drive member.

The shock reducing device can comprise a plurality of carrier-side shock absorbing elements having elastic and/or damping properties. The carrier-side shock absorbing elements can be provided at each of the diagnostic laboratory container diagnostic sample tube carriers. At least a contact portion of a retaining area of a base of each diagnostic sample tube carrier for contacting the payload can be made of or equipped with at least one carrier-side shock absorbing element. At least a portion of a bottom part of a base of each diagnostic sample tube carrier, in which the bottom part can be arranged below a retaining area for the payload, can be made of or equipped with at least one carrier-side shock absorbing element.

The shock reducing device can comprise a plurality of supporting-element-side shock absorbing elements having elastic and/or damping properties. The supporting-element-side shock absorbing elements can be provided at each of the supporting-elements. At least a portion of a receiving area for receiving and holding a received diagnostic sample tube carrier of each supporting element can be made of or equipped with at least one supporting-element-side shock absorbing element.

Each supporting element can have at least a first part comprising the receiving area and a second part. The first part and the second part can be connected moveably relative to each other in a substantially vertical direction by at least one supporting-element-side shock absorbing element. The supporting elements can each be gimbal-mounted, resiliently mounted and/or mounted with play to the drive member.

A supporting element acceleration and/or deceleration device can be provided. The supporting element acceleration and/or deceleration device can be configured for accelerating and/or decelerating the supporting element or at least the first part of the supporting element relative to the drive member when transferring one of the number of diagnostic sample tube carriers onto the supporting element or off the supporting element.

The shock reducing device can comprise a plurality of magnetically active elements. Each magnetically active element can be selected from the group comprising electromagnets, permanent magnets, smart magnets or magnetizable elements. The diagnostic sample tube carriers and the receiving areas of the supporting elements can each comprise at least one magnetically active element. The magnetically active element of the diagnostic sample tube carriers and the magnetically active elements at the receiving areas of the supporting elements can be arranged to repel each other when transferring one of the diagnostic sample tube carriers onto one of the supporting elements or off one of the supporting elements. The magnetically active elements of the diagnostic sample tube carriers and/or of the receiving areas of the supporting elements can be configured for rapidly reversing the polarity, for arranging the magnetically active elements of the diagnostic sample tube carriers and the magnetically active elements of the receiving areas of the supporting elements to repel each other when transferring the diagnostic sample tube carrier onto the supporting element or off the supporting element and to attract each other after a transfer is completed.

A laboratory distribution system for use in a laboratory automation system with a plurality of diagnostic laboratory container carriers and a conveyor device is presented. The conveyor device can comprise an endless drive member such as, for example, a belt or a chain, defining a closed-loop conveyor pathway and a plurality of supporting elements attached to the endless drive member. The supporting elements can be configured for receiving at least one diagnostic laboratory container carrier and for transporting the at least one diagnostic laboratory container carrier in an upright position along at least a section of the conveyor pathway. A carrier acceleration and/or deceleration device can be provided. The carrier acceleration and/or deceleration device can be configured for accelerating and/or decelerating at least one of the plurality of diagnostic sample tube carriers relative to the drive member when transferring the at least one diagnostic sample tube carrier onto one of the plurality of supporting elements or off one of the plurality of supporting elements.

The laboratory distribution system can further comprise at least one transfer device. The transfer device can be configured to cooperate with the supporting elements for transferring one diagnostic laboratory container carrier onto one of the supporting elements and/or for taking-over one diagnostic laboratory container carrier from one of the supporting elements.

A plurality of transfer-device shock absorbing elements having elastic and/or damping properties can be provided. A transfer area for receiving carriers from one of the plurality of supporting elements when transferring the carrier off the supporting element can be made of or equipped with at least one transfer-device shock absorbing element and/or at least a first part of the transfer device provided with the transfer area can be mounted moveable in a substantially vertical direction by at least one transfer-device shock absorbing element.

The transfer device can comprise a holding element arranged in a transfer position in the movement path of the supporting elements. The holding element and the supporting elements can have complementary shapes to avoid an interference of the holding element arranged in the transfer position with the movement path of the supporting elements. The shape of one of the holding element and the supporting elements can be in the form of a fork having at least two fingers and the shape of the other one of the holding element and the supporting elements can be in the form of a jaw passing through the at least two fingers.

The transfer device can comprise a carousel conveyor with a rotatable or swivelable disc having at least one recess for receiving one diagnostic laboratory container carrier. The disc can function as the holding element. The diagnostic laboratory container carrier can be provided with a rim placed on a top surface of the disc in the periphery of the recess for holding the diagnostic laboratory container carrier in the movement path of the supporting elements.

The transfer device can comprise at least one active transfer element for moving one of the plurality of diagnostic laboratory container carriers onto the holding element or for moving one of the plurality of diagnostic laboratory container carriers of the holding element. The active transfer element can be selected from a group comprising a carousel conveyor, a transport belt, a pusher, and a screw conveyor.

The transfer device can be configured for singling out diagnostic laboratory container carriers.

A laboratory automation system with a number of pre-analytical, analytical and/or post-analytical stations and with an above described laboratory distribution system is presented.

It is noted that terms like "preferably," "commonly," and "typically" are not utilized herein to limit the scope of the claimed embodiments or to imply that certain features are critical, essential, or even important to the structure or function of the claimed embodiments. Rather, these terms are merely intended to highlight alternative or additional features that may or may not be utilized in a particular embodiment of the present disclosure.

For the purposes of describing and defining the present disclosure, it is noted that the term "substantially" is utilized herein to represent the inherent degree of uncertainty that may be attributed to any quantitative comparison, value, measurement, or other representation. The term "substantially" is also utilized herein to represent the degree by which a quantitative representation may vary from a stated reference without resulting in a change in the basic function of the subject matter at issue.

Having described the present disclosure in detail and by reference to specific embodiments thereof, it will be apparent that modifications and variations are possible without departing from the scope of the disclosure defined in the appended claims. More specifically, although some aspects of the present disclosure are identified herein as preferred or particularly advantageous, it is contemplated that the present disclosure is not necessarily limited to these preferred aspects of the disclosure.

We claim:

1. A laboratory distribution system for use in a laboratory automation system, the laboratory distribution system comprising:
   a plurality of diagnostic laboratory container carriers, wherein the diagnostic laboratory container carriers are single laboratory container carriers having a circular cylindrical base; and
   a conveyor device, the conveyor device comprising,
      an endless drive member defining a closed-loop conveyor pathway, and
      a plurality of supporting elements attached to the endless drive member,
   wherein the supporting elements each have a receiving area configured to receive a single diagnostic laboratory container carrier and a boundary wall extending at least partly about the receiving area's periphery for centering and retaining the received diagnostic laboratory container carrier, wherein the supporting elements are each configured to transport the received diagnostic laboratory container carrier in an upright position along at least a section of the conveyor pathway, wherein the supporting elements are each mounted pivotally about a horizontal pivot axis by a pivot bearing to the drive member and structured such that a center of gravity of the supporting element with or without an empty or loaded diagnostic laboratory container carrier is arranged below and in a common vertical plane with the pivot axis when the supporting element is in an upright use position such that each supporting element is free to pivot about the associated pivot axis under the effect of gravitational forces acting on the supporting element for maintaining an upright use position while travelling along the conveyor path, and wherein the receiving area is arranged below the pivot axis when the supporting element is in an upright use position.

2. The laboratory distribution system according to claim 1, wherein the supporting elements are each provided with a counterweight arranged below the pivot axis when the supporting element is in an upright use position.

3. The laboratory distribution system according to claim 1, further comprises,
at least one linear extending guiding profile for guiding the endless drive member at least along a section of the closed-loop conveyor pathway.

4. The laboratory distribution system according to claim 1, wherein the pivot bearing is a plain bearing comprising a pin made of steel and a bush made of bronze or plastic.

5. The laboratory distribution system according to claim 1, wherein the pivot bearing is a rolling-element bearing.

6. The laboratory distribution system according to claim 5, wherein the rolling-element bearing is a deep groove ball bearing.

7. The laboratory distribution system according to claim 1, wherein the drive member is a drive chain comprising a plurality of links connected by pins, wherein a subgroup of the pins are extended pins projecting at one side of the drive chain from the links, and wherein each supporting element is pivotally mounted to one extended pin.

8. The laboratory distribution system according to claim 1, wherein each of the diagnostic laboratory container carriers has carrier-side shock absorbing elements having elastic and/or damping properties configured to reduce a mechanical shock exerted on a diagnostic laboratory container retained by one of the plurality of diagnostic laboratory container carriers due to sudden acceleration of the diagnostic laboratory container carrier when transferring the diagnostic laboratory container carrier onto one of the plurality of supporting elements or due to a sudden acceleration of the diagnostic laboratory container carrier when transferring the diagnostic laboratory container carrier off one of the plurality of supporting elements without stopping the drive member and/or disconnecting the supporting elements from the drive member.

9. The laboratory distribution system according to claim 8, wherein each of the diagnostic laboratory container carriers has a base with a retaining area configured to retain diagnostic laboratory containers and a contact portion configured to contact the retained diagnostic laboratory container and wherein the contact portion is made of or equipped with at least one carrier-side shock absorbing element.

10. The laboratory distribution system according to claim 8, wherein each of the diagnostic laboratory container carriers has a base with a retaining area configured to retain diagnostic laboratory containers and a bottom part arranged below the retaining area and wherein at least a portion of the bottom part is made of or equipped with at least one carrier-side shock absorbing element.

11. The laboratory distribution system according to claim 1, wherein each of the supporting elements has a supporting-element-side shock absorbing elements having elastic and/or damping properties, wherein the supporting-element-side shock absorbing elements is configured to reduce a mechanical shock exerted on a diagnostic laboratory container retained by one of the plurality of diagnostic laboratory container carriers due to a sudden acceleration of the diagnostic laboratory container carrier when transferring the diagnostic laboratory container carrier onto one of the plurality of supporting elements or due to a sudden deceleration of the diagnostic laboratory container carrier when transferring the diagnostic laboratory container carrier off one of the plurality of supporting elements without stopping the drive member and/or disconnecting the supporting elements from the drive member.

12. The laboratory distribution system according to claim 11, wherein at least a portion of the receiving area of each supporting element is made of or equipped with the supporting-element-side shock absorbing element.

13. The laboratory distribution system according to claim 11, wherein each supporting element has at least a first part comprising the receiving area and a second part, wherein the first part and the second part are connected moveably relative to each other in a vertical direction by at least one supporting-element-side shock absorbing element.

14. The laboratory distribution system according to claim 1, wherein the supporting elements are each gimbal-mounted, resiliently mounted or mounted with play to the drive member.

15. The laboratory distribution system according to claim 13, further comprises,
a supporting element deceleration device, wherein the supporting element deceleration device is configured for decelerating the supporting element or at least the first part of the supporting element relative to the drive member when transferring one of the plurality of diagnostic laboratory container carriers onto the supporting element or off the supporting element.

16. The laboratory distribution system according to claim 1, wherein each of the diagnostic laboratory container carriers and each of the receiving areas of the supporting elements comprises a magnetically active element, each magnetically active element being selected from the group comprising electro-magnets, permanent magnets, smart magnets or magnetizable elements, and wherein the magnetically active element of each of the diagnostic laboratory container carriers and the magnetically active element at the receiving areas of each of the supporting elements are arranged to repel each other when transferring one of the diagnostic laboratory container carriers onto one of the supporting elements or off one of the supporting elements.

17. The laboratory distribution system according to claim 16, wherein at least one of the magnetically active elements of each diagnostic laboratory container carriers and the magnetically active element of the receiving areas of each of the supporting elements is configured for rapidly reversing the polarity, for arranging the magnetically active elements for each of the diagnostic laboratory container carriers and the magnetically active elements of the receiving areas of each of the supporting elements to repel each other when transferring the diagnostic laboratory container carrier onto the supporting element or off the supporting element and to attract each other after a transfer is completed.

18. The laboratory distribution system according to claim 1, further comprises,
at least one of a carrier acceleration and a carrier deceleration device, wherein the carrier acceleration device is configured for accelerating one of the plurality of diagnostic laboratory container carriers relative to the drive member when transferring the diagnostic laboratory container carrier onto one of the plurality of supporting elements one of the number of supporting elements and the carrier deceleration device is configured for decelerating one of the plurality of diagnostic laboratory container carriers relative to the drive member when transferring the diagnostic laboratory container carrier off one of the number of supporting elements.

19. The laboratory distribution system according to claim 1, further comprises,
at least one transfer device, the transfer device is configured to cooperate with the supporting elements for transferring one diagnostic laboratory container carrier onto one of the supporting elements and/or for taking-over one diagnostic laboratory container carrier from one of the supporting elements, wherein the at least one transfer device has a transfer area for receiving one of the plurality of diagnostic laboratory container carriers from one of the plurality of supporting elements when transferring the diagnostic laboratory container carrier off the supporting element.

20. The laboratory distribution system according to claim 19, wherein at least a first part of the transfer device is provided with the transfer area and is mounted moveable in a vertical direction by at least one transfer-device shock absorbing element having elastic and/or damping properties.

21. The laboratory distribution system according to claim 19, wherein the transfer device comprises a holding element arranged in a transfer position in the movement path of the supporting elements, wherein the shape of one of the holding element and the supporting elements is in the form of a fork having at least two fingers and the shape of the other one of the holding element and the supporting elements is in the form of a jaw passing through the at least two fingers.

22. The laboratory distribution system according to claim 19, wherein the transfer area is made of or equipped with at least one transfer-device shock absorbing element having elastic and/or damping properties.

23. A laboratory automation system, the laboratory automation system comprising:
a plurality of pre-analytical, analytical and/or post-analytical stations; and
a laboratory distribution system according to claim 1.

* * * * *